United States Patent
Matsubara et al.

(10) Patent No.: US 7,798,938 B2
(45) Date of Patent: Sep. 21, 2010

(54) CONTROLLER SYSTEM FOR DEVICE UNIT OF VEHICLE

(75) Inventors: Tooru Matsubara, Toyota (JP); Takashi Ohta, Toyota (JP); Hideaki Komada, Gotenba (JP); Yukihiko Ideshio, Susono (JP); Hiroyuki Shibata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 301 days.

(21) Appl. No.: 12/091,126

(22) PCT Filed: Oct. 26, 2006

(86) PCT No.: PCT/JP2006/321344

§ 371 (c)(1),
(2), (4) Date: Apr. 22, 2008

(87) PCT Pub. No.: WO2007/049681

PCT Pub. Date: May 3, 2007

(65) Prior Publication Data

US 2009/0137361 A1    May 28, 2009

(30) Foreign Application Priority Data

Oct. 26, 2005    (JP)  .............................. 2005-312063

(51) Int. Cl.
*B60K 1/02*    (2006.01)
(52) U.S. Cl. .......................................................... 477/3
(58) Field of Classification Search ........................ None
See application file for complete search history.

(56) References Cited

U.S. PATENT DOCUMENTS 6,561,947 B2* 5/2003 Koelle et al. ................... 477/3

| | | | |
|---|---|---|---|
| 2006/0166784 A1 | 7/2006 | Tabata et al. | |
| 2008/0153661 A1* | 6/2008 | Shibata et al. | 477/3 |
| 2008/0318727 A1* | 12/2008 | Matsubara et al. | 477/3 |
| 2009/0069147 A1* | 3/2009 | Tabata et al. | 477/3 |
| 2009/0156359 A1* | 6/2009 | Tabata et al. | 477/108 |
| 2010/0087287 A1* | 4/2010 | Tabata et al. | 477/3 |

FOREIGN PATENT DOCUMENTS

| | | |
|---|---|---|
| JP | 9 322307 | 12/1997 |
| JP | 9 331603 | 12/1997 |
| JP | 10 184410 | 7/1998 |
| JP | 2000 2327 | 1/2000 |
| JP | 2003 127681 | 5/2003 |
| JP | 2004 140993 | 5/2004 |
| JP | 2005 145100 | 6/2005 |
| JP | 2005 256883 | 9/2005 |
| JP | 2005 273900 | 10/2005 |

* cited by examiner

*Primary Examiner*—Dirk Wright
(74) *Attorney, Agent, or Firm*—Oblon, Spivak, McClelland, Maier & Neustadt, L.L.P.

(57) ABSTRACT

A control system for a drive unit of a vehicle, including a reaction force establishing device controlling a speed change ratio of a continuously variable transmission, and a clutch mechanism arranged on a power transmission route from the continuously variable transmission to a wheel and in which a torque capacity thereof is controllable. A first input torque control mechanism lowers a torque to be inputted to the clutch mechanism through the continuously variable transmission, by controlling a torque of the reaction force establishing device while the torque capacity of the clutch mechanism is being controlled. The system reduces a change in a torque inputted to a clutch mechanism, in case of carrying out a speed change operation of a continuously variable transmission and engaging the clutch mechanism.

28 Claims, 11 Drawing Sheets

|     | C1 | C2 | B1 | B2 |
|-----|----|----|----|----|
| 1st | ○  |    |    | ○  |
| 2nd | ○  |    | ○  |    |
| 3rd | ○  | ○  |    |    |
| 4th | ○  | ○  |    |    |
| R   |    | ○  |    | ○  |
| N   |    |    |    |    |

CONTROLLER SYSTEM FOR DEVICE UNIT OF VEHICLE

TECHNICAL FIELD

This invention relates to a control system for a drive unit of a vehicle which has a plurality of prime movers for transmitting power to a wheel.

BACKGROUND ART

In recent years, a hybrid vehicle comprising an engine and a motor generator is provided for the purpose of saving a fuel for driving the engine, and reducing a noise resulting from a driving of the engine and emission resulting from combustion of a fuel. This kind of hybrid vehicle is driven by controlling the engine and the motor generator according to a running condition of the vehicle.

Specifically, the hybrid vehicle can be run by driving the engine in a revolution region where combustion efficiency thereof is preferable, and also by using the motor generator as a motor while halting the engine in a revolution region where the combustion efficiency of the engine is degraded. One example of a control system for a drive system thus having an engine and a motor generator is disclosed in Japanese Patent Laid-Open No. 2003-127681. According to the system disclosed in Japanese Patent Laid-Open No. 2003-127681, an output torque of an internal combustion engine is transmitted to a wheel via a planetary gear mechanism, a transmission, a propeller shaft, a differential device and a vehicle axle. The planetary gear mechanism comprises a sun gear, ring gear and a carrier, and a crankshaft of the engine is connected with the carrier. Also, a first motor/generator is provided and a rotor thereof is connected with the sun gear. The ring gear is connected with the transmission. On the other hand, a second motor/generator is provided and a rotor thereof is connected with the propeller shaft. Japanese Patent Laid-Open No. 2003-127681 describes that torque of the vehicle axle is generated by the internal combustion engine and the second motor/generator, and a transmission having a plurality of planetary gear mechanisms, a clutch and a brake is disclosed therein as an example of the transmission. A first gear position, a second gear position, a third gear position and a reverse position of the transmission are achieved by controlling an engagement and a releasing of the clutch and the brake.

According to the vehicle disclosed in Japanese Patent Laid-Open No. 2003-127681, if an upshift operation is carried out to reduce the gear ratio of the transmission when an accelerator is on, in other words, when the torque of the internal combustion engine is being transmitted the wheel via the planetary gear mechanism and the transmission, the output torque of the transmission may be changed as a result of engaging and releasing operations of the clutch and the brake. Consequently, a shocks may be amplified.

DISCLOSURE OF THE INVENTION

The present invention has been conceived noting the technical problems thus far described, and its object is to provide a control system for a drive unit of a vehicle, which is capable of reducing a change in a torque inputted to a clutch mechanism, in case of carrying out a speed change operation of a continuously variable transmission, and controlling a torque capacity of the clutch mechanism.

In order to achieve the above-mentioned object, according to the present invention, there is provided a control system for a drive unit of a vehicle, which has a reaction force establishing device controlling a speed change ratio of a continuously variable transmission, and a clutch mechanism which is arranged on a power transmission route from the continuously variable transmission to a wheel and in which a torque capacity thereof is controllable, characterized by comprising a first input torque control means for lowering a torque to be inputted to the clutch mechanism through the continuously variable transmission, by controlling a torque of the reaction force establishing device while the torque capacity of the clutch mechanism is being controlled.

In addition to above, according to the present invention, a prime mover is arranged on an input side of the clutch mechanism. Also, the system of the invention comprises an inertia phase judging means determining an inertia phase established as a result of controlling the torque capacity of the clutch mechanism. Here, the first input torque control means includes a means for lowering the torque inputted to the input side of the clutch mechanism by controlling a torque of the prime mover before a commencement of the inertia phase, and a means for lowering the torque inputted to the clutch mechanism by lowering a reaction torque established by the reaction force establishing means once the inertia phase commences.

According to the invention, the engine is connected to the input side of the continuously variable transmission, the reaction force establishing device is a first electric motor, the prime mover is a second electric motor, and the continuously variable transmission is an electrical continuously variable transmission. A transmission, in which a gear stage thereof is controlled by controlling the torque capacity of the clutch mechanism, is arranged on an output side of the electrical continuously variable transmission. The electrical continuously variable transmission comprises an input element, a reaction element and an output element capable of rotating differentially among each other. The input element is connected with the engine, the reaction element is connected with the first electric motor, and the output element is connected with the second electric motor and the input side of the transmission. A speed change ratio of the electrical continuously variable transmission can be controlled steplessly by controlling an output of the first electric motor establishing a reaction force against the engine. The inertia phase judging means includes a means for determining an inertia phase in the process of carrying out a shifting operation of the transmission while the engine torque is being transmitted to the transmission through the electrical continuously variable transmission.

The first input torque control means includes a means starting a control for lowering the reaction torque established by the reaction force establishing device, in case the torque capacity of the clutch mechanism exceeds a torque inputted to the clutch.

The present invention is characterized by further comprising: a target input revolution calculating means for calculating a target input revolution of the transmission after a commencement of the inertia phase in the process of the shifting operation of the transmission; a first torque capacity control means obtaining a target torque capacity of the clutch mechanism to be engaged under the gear stage after the shifting operation of the transmission according to a change in the target input revolution, and then controlling an actual torque capacity of the clutch mechanism in the process of the shifting operation of the transmission to approximate to the target torque capacity; and an electric motor control means obtaining a target input revolution of the first electric motor in the process of the shifting operation based on the target input revolution of the transmission and a target engine revolution, and controlling an actual input revolution of the first electric motor to approximate to the target input revolution of the first electric motor.

The present invention further comprises: an input torque calculating means for calculating a torque inputted to the transmission on the basis of a speed change ratio of the electrical continuously variable transmission and a correction value used for a feedback control of the torque of the first electric motor, after the commencement of the inertia phase in the process of a shifting operation of the transmission; and a second torque capacity control means for controlling the torque capacity of the clutch mechanism on the basis of the input torque of the transmission obtained from the correction value, in case of controlling the input revolution of the transmission after the commencement of the inertia phase in the process of the shifting operation of the transmission.

In addition to above, the present invention further comprises: an electric power feeding device for exchanging electric power with the first and the second electric motors; and an electric power balance control means for controlling an output of the second electric motor on the basis of a balance of electric power in the electric power feeding device, in case of equalizing the engine power by reducing the reaction force established by the first electric motor after the commencement of the inertia phase in the transmission, and by controlling the second electric motor.

In addition to above, the present invention further comprises: a second input torque control means for lowering a torque to be inputted to the transmission by lowering the torque of the second electric motor during the shifting operation of the transmission, in case the torque of the second electric motor is transmitted to the wheel but the torque of the engine is not transmitted to the wheel.

In addition to above, the present invention further comprises: an engine revolution control means for reducing a change in the engine revolution in the process of a shifting operation of the transmission.

Further, according to the invention, the transmission is arranged on a route to which the power is outputted from the continuously variable transmission. The continuously variable transmission is constructed of an electrical continuously variable transmission in which a speed change ratio thereof is controlled electrically and varied continuously, and the transmission is constructed of a geared transmission in which a gear stage thereof is changed stepwise. Those electrical continuously variable transmission and geared transmission may be connected in tandem so as to input power outputted from any one of those transmissions to the other one. Also, a total speed change ratio of the drive unit may be set by both of the electrical continuously variable transmission and geared transmission.

According to the invention, the electrical continuously variable transmission includes a planetary gear mechanism comprising a carrier functioning as an input element, a sun gear functioning as a reaction element, and a ring gear functioning as an output element.

On the other hand, the transmission is constructed of two sets of planetary gear mechanisms and a plurality of engagement devices, and the aforementioned clutch mechanism includes a plurality of engagement devices.

In addition to above, according to the invention, the two sets of planetary gear mechanisms include a single pinion type planetary gear mechanism. The sun gears of the first and the second planetary gear mechanisms are connected with each other, and the carrier of the first planetary gear mechanism and the ring gear of the second planetary gear mechanism are connected with each other. Also, the engagement device comprises: a first clutch connecting the ring gear of the first planetary gear mechanism with the output element of the power distribution mechanism selectively; a second clutch connecting the sun gear of the first planetary gear mechanism and the sun gear of the second planetary gear mechanism with the output element of the power distribution mechanism selectively; a first brake fixing the sun gears of the first and the second planetary gear mechanisms selectively; and a second brake fixing the carrier of the second planetary gear mechanisms selectively.

In addition to above, according to the drive unit to which the invention is applied, the reaction force establishing device is a first electric motor; the continuously variable transmission is an electrical continuously variable transmission; and a transmission, in which a gear stage thereof is controlled by controlling the torque capacity of the clutch mechanism, is arranged on an output side of the electrical continuously variable transmission; and the control system of the invention comprises: an input torque calculating means for calculating a torque inputted to the transmission on the basis of a speed change ratio of the electrical continuously variable transmission and a correction value used for a feedback control of the torque of the first electric motor, after the commencement of the inertia phase in the process of a shifting operation of the transmission; and a second torque capacity control means for controlling the torque capacity of the clutch mechanism on the basis of the input torque of the transmission obtained from the correction value, in case of controlling the input revolution of the transmission after the commencement of the inertia phase in the process of the shifting operation of the transmission.

In addition to above, according to the drive unit to which the invention is applied, a second electric motor is arranged on the input side of the clutch mechanism; the engine is connected to the input side of the continuously variable transmission; and a transmission, in which a gear stage thereof is controlled by controlling the torque capacity of the clutch mechanism, is arranged on an output side of the electrical continuously variable transmission; and the control system of the invention further comprises: a second input torque control means for lowering a torque to be inputted to the transmission by lowering the torque of the second electric motor during the shifting operation of the transmission, in case the torque of the second electric motor is transmitted to the wheel but the torque of the engine is not transmitted to the wheel.

In addition to above, the control system of the invention comprises: an input torque calculating means for calculating a torque inputted to the transmission on the basis of a speed change ratio of the electrical continuously variable transmission and a correction value used for a feedback control of the torque of the first electric motor; upon commencement of the inertia phase in the process of a shifting operation of the transmission; and a second torque capacity control means for controlling the torque capacity of the clutch mechanism on the basis of the input torque of the transmission obtained from the correction value, in case of controlling the input revolution of the transmission upon commencement of the inertia phase in the process of the shifting operation of the transmission.

According to the invention, therefore, a driving force is generated by transmitting the torque outputted from the continuously variable transmission to the wheel through the clutch mechanism. As mentioned above, the torque inputted to the clutch mechanism is lowered by controlling the torque of the reaction force establishing device during the control of the torque capacity of the clutch is being carried out. For this reason, shocks resulting from the control of the torque capacity of the clutch can be minimized.

In addition to the above-mentioned advantage, the torque of the prime mover can be inputted to the clutch mechanism. Moreover, the torque inputted to the input side of the clutch mechanism is lowered by controlling the torque of the prime mover, before the commencement of the inertia phase established by controlling the torque capacity of the clutch mechanism. Further, the torque inputted to the clutch mechanism is lowered by reducing the reaction torque established by the reaction force establishing device, once the inertia phase commences. Therefore, it is possible to suppress the shocks from before the commencement of the inertia phase even after the commencement of the inertia phase.

According to the invention, the speed change ratio of the electrical continuously variable transmission is controlled by controlling the output of the electric motor while the engine torque is being transmitted to the clutch mechanism through the continuously variable transmission. Also, the gear stage of the transmission is controlled by controlling the torque capacity of the clutch mechanism while the torque outputted from the continuously variable transmission is being transmitted to the transmission. Further, the inertia phase is judged in the process of the shifting operation while the engine torque is being transmitted to the transmission through the electrical continuously variable transmission.

Also, according to the invention, the reaction torque established by the reaction force establishing device is lowered in case the torque capacity of the clutch mechanism exceeds the torque to be inputted to the clutch.

In addition to above, according to the invention, the target input revolution of the transmission is obtained after the commencement of the inertia phase in the process of the shifting operation of the transmission. Then, a target torque capacity of the clutch mechanism to be engaged in the gear stage after the shifting operation of the transmission is obtained according to the change in the target input revolution. After that, the actual torque capacity of the clutch mechanism in the process of the shifting operation of the transmission is controlled to be approximated to the target torque capacity. Also, the target input revolution of the first electric motor in the process of the shifting operation of the transmission is obtained on the basis of the target input revolution of the transmission and the target engine revolution, and the actual input revolution of the first electric motor is controlled to be approximated to the target input revolution of the first electric motor.

In addition to above, according to the invention, the torque inputted to the transmission is calculated on the basis of the speed change ratio of the electrical continuously variable transmission and the correction value used for a feedback control of the torque of the first electric motor, after the commencement of the inertia phase in the process of a shifting operation of the transmission. Also, the torque capacity of the clutch mechanism is controlled on the basis of the obtained input torque of the transmission, in case of controlling the input revolution of the transmission after the commencement of the inertia phase in the process of the shifting operation of the transmission.

Moreover, according to the invention, the electric power is exchanged between the electric power feeding device and the first electric motor, and between the electric power feeding device and the second electric motor. Also, according to the invention, the engine power can be equalized by reducing the reaction force established by the first electric motor after the commencement of the inertia phase in the transmission, and by controlling the second electric motor. Additionally, the output of the second electric motor can be controlled on the basis of the balance of electric power in the electric power feeding device.

Further, according to the invention, the torque to be inputted to the transmission is lowered by lowering the torque of the second electric motor during the shifting operation of the transmission, in case the torque of the second electric motor is transmitted to the wheel but the torque of the engine is not transmitted to the wheel.

Furthermore, according to the invention, a change in the engine revolution in the process of a shifting operation of the transmission can be suppressed.

In addition to the above advantages, according to the invention, the torque inputted to the transmission is calculated on the basis of a speed change ratio of the electrical continuously variable transmission and a correction value used for a feedback control of the torque of the first electric motor, upon commencement of the inertia phase in the process of a shifting operation of the transmission. Further, the torque capacity of the clutch mechanism is controlled on the basis of the input torque of the transmission obtained from the correction value, in case of controlling the input revolution of the transmission upon commencement of the inertia phase in the process of the shifting operation of the transmission.

BEST MODE FOR CARRYING OUT THE INVENTION

Figure 2:
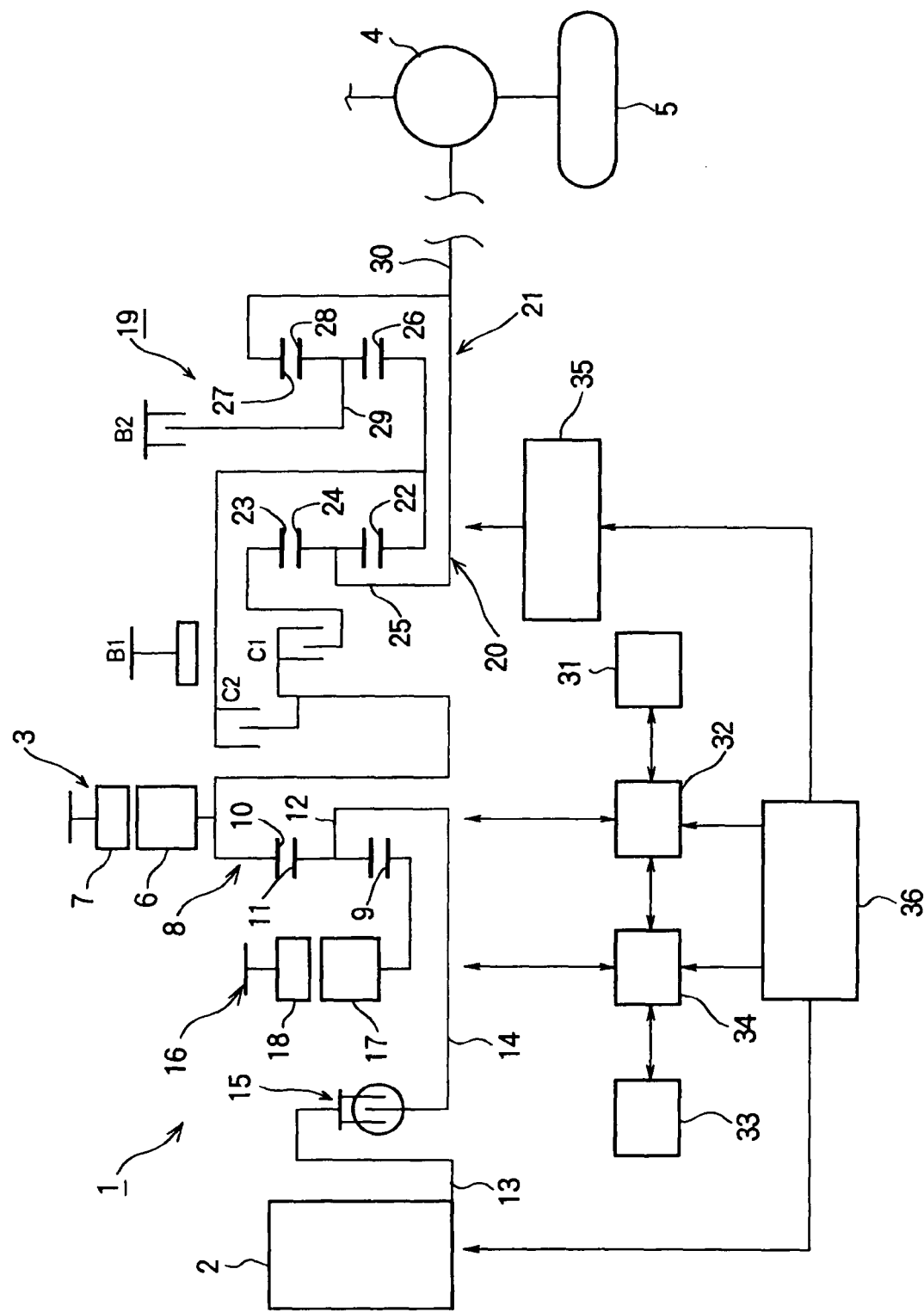
FIG. 2 is a schematic diagram showing a power train of a hybrid vehicle and a control line thereof to which the invention is applied.

Next, the present invention will be explained more specifically with reference to the accompanying drawings. FIG. 2 is a skeleton diagram showing one example of a power train of a hybrid vehicle to which the invention is applied. There are provided an engine 2 and a motor generator 3 (MG2) functioning as prime movers of a vehicle 1. The engine 2 and the motor generator 3 (MG2) are connected with a wheel 5 through a differential mechanism 4. The engine 2 is a power unit converting a thermal energy into a kinetic energy by burning a fuel. For example, an internal combustion engine such as a gasoline engine, a diesel engine, an LPG engine and so on can be used as the engine 2. The motor generator 3 comprises a rotor 6 and a stator 7. The motor generator 3 converts electric energy into mechanical energy, and converts mechanical energy into electrical energy. That is, the motor generator 3 functions as a motor (i.e., power generating function) and also functions as a generator (i.e., regenerating function).

A power distribution mechanism 8 is arranged on a route from the engine 2 to the differential mechanism 4. The power distribution mechanism 8 is composed mainly of a single pinion type planetary gear mechanism. Specifically, the power distribution mechanism 8 comprises: a sun gear 9 and a ring gear 10 arranged coaxially; and a carrier 12, which holds a pinion gear 11 meshing with the sun gear 9 and the ring gear 10 in a rotatable and revolvable manner. A crankshaft 13 of the engine 2 and an input shaft 14 are arranged coaxially, and those shafts are connected in a power transmittable manner through a damper mechanism 15. Also, the carrier 12 is connected with the input shaft 14 to rotate integrally therewith. Rotary elements of the power distribution mechanism 8 are composed mainly of a gear mechanism capable of rotating differentially. As explained later, a speed change ratio of the power distribution mechanism 8 can be controlled electrically.

An another motor generator 16 (MG1) is provided between the engine 2 and the power distribution mechanism 8 in an anteroposterior direction of the vehicle 1. The motor generator 16 also comprises a rotor 17 and a stator 18. The motor generator 16 also converts electric energy into mechanical energy, and converts mechanical energy into electrical energy. That is, the motor generator 16 also functions as a motor (i.e., power generating function) as well as a generator (i.e., regenerating function). The rotor 17 of the motor generator 16 is connected with the sun gear 9 in a power transmittable manner. In other words, the rotor 17 and the sun gear 9 are connected to rotate integrally. Also, the rotor 6 of the motor generator 3 is connected with the ring gear 10 in a power transmittable manner. In other words, the rotor 6 and the ring gear 10 are connected to rotate integrally. Thus, the vehicle 1 comprises two kinds of prime movers having different principles of power generation, such as the engine 2, and the motor generators 3 and 16.

A transmission 19 is arranged on a route from the ring gear 10 of the power distribution mechanism 8 to the differential 4. The transmission 19 is a geared transmission capable of controlling a ratio between an input revolution and an output revolution, i.e., a gear stage thereof stepwise (i.e., discontinuously). The transmission 19 comprises two sets of planetary gear mechanisms, specifically, a first planetary gear transmission mechanism 20 and a second planetary gear transmission mechanism 21. The first planetary gear transmission mechanism 20 is a single pinion type planetary gear mechanism comprising: a sun gear 22 and a ring gear 23 arranged coaxially; and a carrier 25, which holds a pinion gear 24 meshing with the sun gear 22 and the ring gear 23 in a rotatable and revolvable manner. On the other hand, the second planetary gear mechanism 21 is also a single pinion type planetary gear mechanism comprising: a sun gear 26 and a ring gear 27 arranged coaxially; and a carrier 29, which holds a pinion gear 28 meshing with the sun gear 26 and the ring gear 27 in a rotatable and revolvable manner.

The sun gears 22 and 26 are connected to rotate integrally, and the carrier 25 is connected with the ring gear 27 to rotate integrally. The carrier 25 and the ring gear 27 are connected with an output shaft 30 of the transmission 19. The transmission 19 further comprises clutch mechanisms for connecting, disconnecting and fixing the rotary elements such as the gears and the carriers. Here, both types, i.e., hydraulic and electromagnetic clutches may be used, however, a hydraulic clutch is used in this example. Specifically, there are provided a clutch C1 connecting and releasing the ring gears 10 and 23, and a clutch C2 connecting the ring gear 10 with the sun gears 22 and 26, and releasing the ring gear 10 from the sun gears 22 and 26. Also, there are provided a brake B1 for controlling a rotation and a cessation of the sun gears 22 and 26, and a brake B2 for controlling a rotation and a cessation of the carrier 29.

Figure 3:
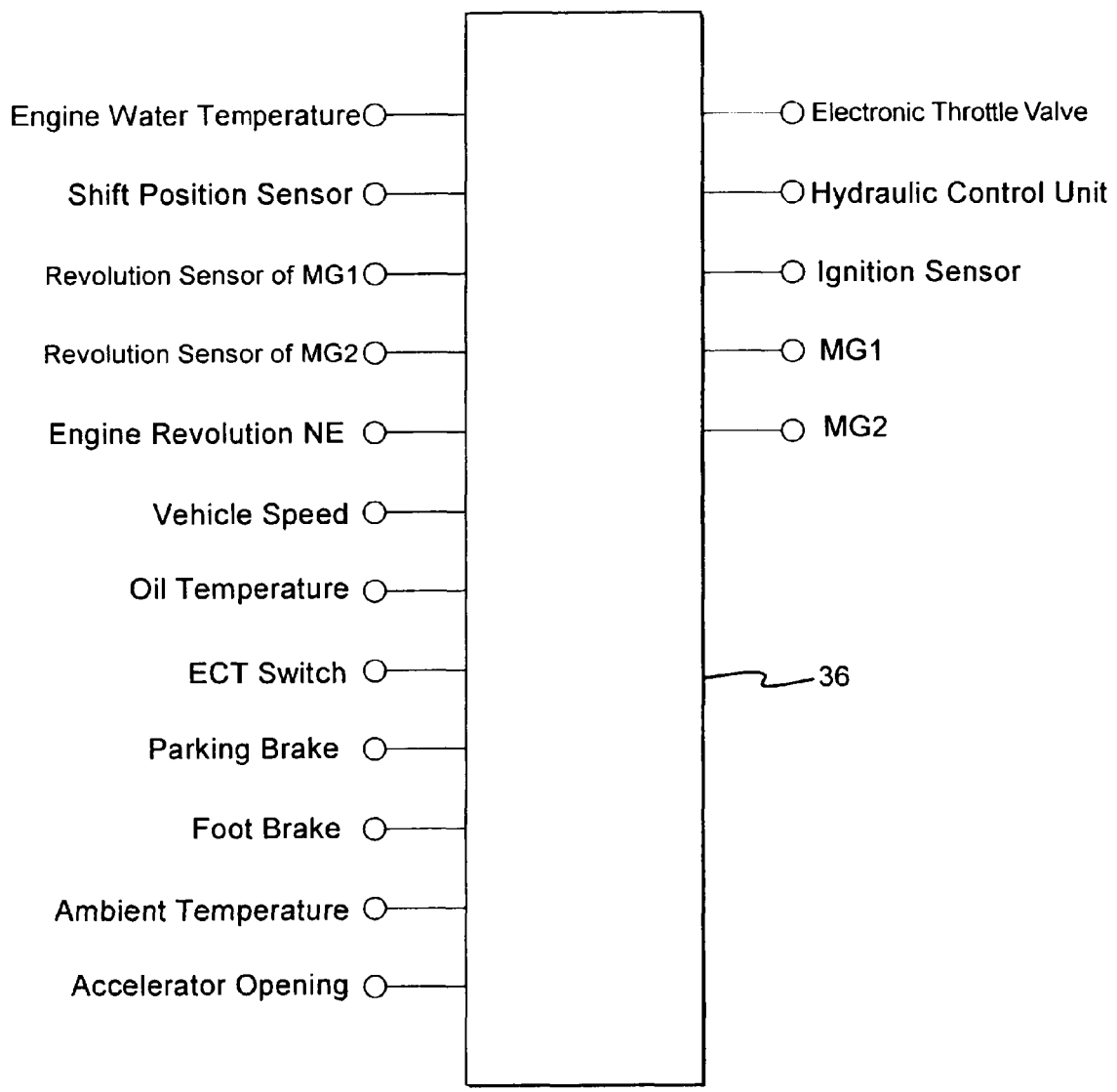
FIG. 3 is a schematic diagram showing signals inputted to an electronic control unit of the vehicle shown in FIG. 2, and signals outputted therefrom.

Next, a control line of the vehicle 1 will be explained hereinafter. There are provided an electric storage device 31 exchanging electric power with the motor generator 3, and an inverter 32 for controlling the motor generator 3. Also, there are provided an electric storage device 33 exchanging electric power with the motor generator 16, and an inverter 34 for controlling the motor generator 16. A secondary battery, more specifically, a battery, a capacitor and so on can be used as the electric storage devices 31 and 33. Further, there is provided a hydraulic control unit 35 functioning as an actuator to control the clutches C1 and C2 and the brakes B1 and B2 of the transmission 19. The hydraulic control unit 35 is a known unit comprising a hydraulic circuit, a solenoid valve and so on. Also, there is provided an electronic control unit 36 for controlling the engine 2, the inverters 32 and 34, and the hydraulic control unit 35. As shown in FIG. 3, a signal from a shift range sensor, a signal from an engine water temperature sensor, signals from a revolution sensors of the motor generators 3 and 16, a signal from an engine revolution sensor, a signal from a vehicle speed sensor, a signal from an ambient temperature sensor, a signal from an oil temperature sensor, a signal from an ECT switch, a signal from a parking brake switch, a signal from a foot brake switch, a signal from an accelerator opening sensor, signals from an input revolution sensor and an output revolution sensor of the transmission 19 and so on are inputted to the electronic control unit 36. On the other hand, a signal for controlling an electronic throttle valve of the engine 2, a signal for controlling a fuel injection device of the engine 2, a signal for controlling an ignition device of the engine 2, signals for controlling the motor generators 3 and 16 through the inverters 32 and 34, a signal for controlling the hydraulic control unit 35 and so on are outputted from the electronic control unit 36.

Next, here will be explained a control of the vehicle 1. The engine torque is transmitted to the carrier 12 of the power distribution mechanism 8 through the input shaft 14 by driving the engine 2, and the engine torque is outputted from the ring gear 10 of the power distribution mechanism 8 by establishing a reaction force against the engine torque by the motor generator 16. A speed change ratio of the power distribution mechanism 8 can be controlled steplessly (i.e., continuously) by controlling a rotational direction (i.e., forward and backward) of the motor generator 16, and by controlling an operating state thereof between a motor and a generator. Specifically, the carrier 12 functions as an input element, the sun gear 9 functions as a reaction element, and the ring gear 10 functions as an output element. In this situation, the power distribution mechanism 8 functions as a continuously variable transmission as a result of a differential action performed by the carrier 12, the sun gear 9 and the ring gear 10. Therefore, a revolution frequency of the engine 2 can be varied continuously without changing a revolution frequency of the ring gear 10. For example, the speed change ratio of the power distribution mechanism 8 can be controlled by the following method. First of all, a drive demand is obtained on the basis of an opening degree of an accelerator and a vehicle speed, and a target engine output is obtained on the basis of the drive demand. In order to achieve the target engine output, an operating condition of the engine 2 is determined in line with an optimum fuel economy curve, and a target engine revolution and a target engine torque are obtained. Then, the speed change ratio of the power distribution mechanism 8, more specifically, an input revolution is controlled to approximate an actual engine revolution to the target engine revolution. Also, an opening degree of an electronic throttle valve or the like is controlled to approximate the actual engine torque to the target engine torque. Further, a target output of the motor generator 3 is obtained on the basis of the drive demand. Consequently, at least one of the engine torque and the torque of the motor generator 3 is transmitted to the wheel 5 through the transmission 19 thereby driving the wheel 5.

Figures 4, 5:
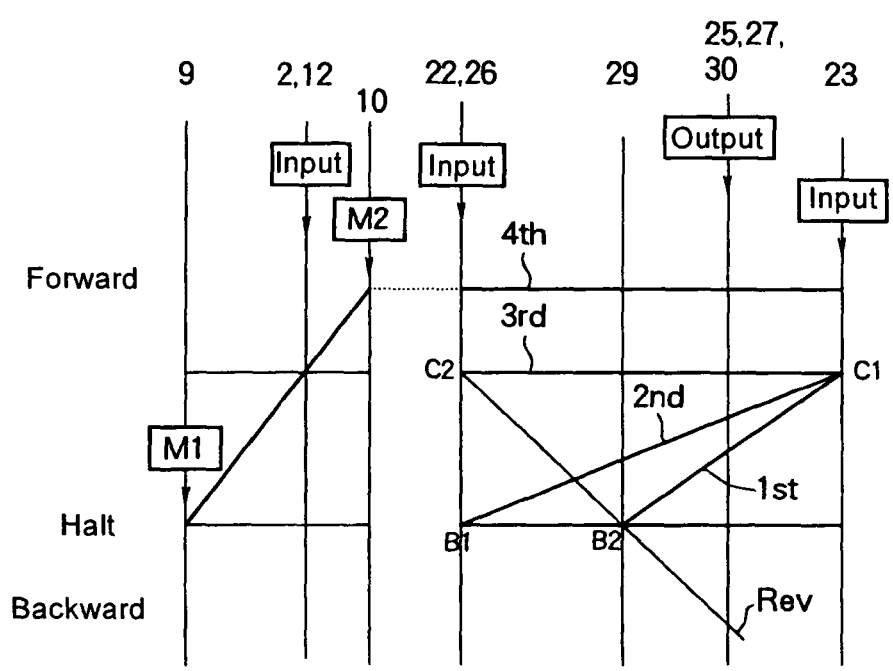
FIG. 4 is a table showing operating states of the clutch mechanisms in each gear stage of D range and R range of the transmission shown in FIG. 2.
FIG. 5 is a nomographic diagram showing shift ranges set by the power distribution mechanism and the transmission shown in FIG. 2.

A shift range for controlling the transmission 19 can be selected from e.g., P (i.e., parking) range, R (i.e., reverse) range, N (i.e., neutral) range and D (i.e., drive) range. For example, in case D range is selected in the transmission 19 shown in FIG. 2, the gear stage of the transmission 19 can be shifted selectively within a first (1st) stage, a second (2nd) stage, a third (3rd) stage and a fourth (4th) stage. In order to shift the gear stage selectively, a speed change map for determining the gear stage according to a vehicle speed and an opening degree of the accelerator is stored in the electronic control unit 36. Control states of the clutch mechanisms under each gear stage of D range, and also N and R ranges are indicated in FIG. 4. In FIG. 4, "◯" in a column represents an engagement of the corresponding clutch mechanism, and a blank column represents a state where the corresponding clutch mechanism is released. Specifically, in case of setting the first stage, the clutch C1 and the brake B2 are engaged, and the clutch C2 and the brake B1 are released. In case of setting the second stage, the clutch C1 and the brake B1 are engaged, and the clutch C2 and the brake B2 are released. In case of setting the third or fourth stage, both of the clutches C1 and C2 are engaged, and both of the brakes B1 and B2 are released. Here, in case of setting the third or fourth stage, the control contents for the transmission 19 are identical in both cases, however, different controls are carried out for the power distribution mechanism 8 in each case. Details of such differences will be explained later. In case of setting R range, the clutch C2 and the brake B2 are engaged, and the clutch C1 and the brake B1 are released. In case that N or P range is selected, all of the clutch mechanisms are released.

Next, statuses of the rotary elements of the transmission 19 under D range will be explained with reference to FIG. 5. In the part of FIG. 5 representing the power distribution mechanism 8, an ordinate axis of the carrier 12 (i.e., an engine 2) is situated between axes of the motor generators 3 and 16. In FIG. 5, "Forward" means a forward rotation, and "Backward" means a backward direction. Here, the "forward direction" means a rotational direction of the engine 2. In case the first stage is selected, the clutch C1 is engaged, and at least one of the torques of the engine 2 and the motor generator 3 is inputted to the ring gear 28 of the transmission 19. In this case, the carrier 29 halted by engaging the brake B2 functions as a reaction element, and the torques outputted from the carrier 25 and the ring gear 27 are transmitted to the output shaft 30. Consequently, the wheel 5 is driven by the torque of the output shaft 30 transmitted to through the differential 4. In case the first stage is thus selected, revolution frequencies of the ring gear 27 and the carrier 25 are lower than that of the ring gear 23. That is, a speed change ratio of the transmission 19 is larger than "1".

In case the second stage is selected, the clutch C1 and the brake B1 are engaged. Therefore, at least one of the torques of the engine 2 and the motor generator 3 is inputted to the ring gear 28 of the transmission 19. In this case, the halted sun gear 22 functions as a reaction element, and the torque outputted from the carrier 25 is transmitted to the output shaft 30. In case the second stage is thus selected, a revolution frequency of the carrier 25 is lower than that of the ring gear 23. That is, a speed change ratio of the transmission 19 is larger than "1". Here, provided that the input revolution is constant, the revolution frequency of the carrier 25 under the first gear stage is lower than that under the second stage. This means that the speed change ratio of the case in which the first stage is set is larger than that of the case in which the second stage is set.

In case the third or fourth stage is selected, both of the clutches C1 and C2 are engaged, therefore, all of the rotary members constituting the first and the second planetary gear transmission mechanisms 20 and 21 are rotated integrally. That is, in case the third or fourth stage is set, the speed change ratio of the transmission 19 is "1". In other wards, the input rotary element and the output rotary element of the transmission 19 are connected directly. Here, a difference between the third stage and the fourth stage is that the motor generator 16 of the power distribution mechanism 8 will not be halted in case of setting the third stage, but it will be halted, i.e., the revolution frequency thereof is zero in case of setting the fourth stage. In case R range is selected, the clutch C2 is engaged, therefore, the sun gear 26 functions as an input element and the carrier 29 functions as a reaction element. Consequently, the ring gear 27 is rotated backwardly. Here, the nomographic diagram of FIG. 5 shows a case in which the revolution frequency of the engine 2 is constant.

Here will be explained a control method of carrying out an upshifting, i.e., a shifting operation for reducing the speed change ratio with reference to the flowchart in FIG. 1. A precondition for this control method is that the motor generator 16 establishing a reaction force against the engine torque has already been operated as a motor in the backward direction, and the motor generator 3 has already been operated as a generator in the forward direction, before carrying out the upshifting operation. First of all, it is judged whether or not a shifting operation of the gear stage of the transmission 19 is being carried out while an accelerator of the vehicle 1 is on, that is, while an engine torque is being transmitted to the wheel 5 through the power distribution mechanism 8 and the transmission 19 (at Step S1). The shifting operation to be judged at Step S1 is an upshifting operation, more specifically, an upshifting operation in which an engagement and releasing of the clutch mechanisms are involved. For example, the upshifting operation to be judged at S1 may be any of an upshifting operation from the first stage to the second stage, and an upshifting operation from the second stage to the third stage. However, according to the transmission 19 shown in FIG. 2, an engagement and releasing of the clutch mechanisms are not carried out in case of the upshifting from the third stage to the fourth stage. Therefore, the upshifting operation from the third stage to the fourth stage is not categorized into the "upshifting" to be judged at Step S1. In case the answer of Step S1 is NO, this control routine is ended.

To the contrary, in case the answer of the answer of Step S1 is YES, it is judged whether or not an inertia phase commences in the process of the shifting operation of the transmission 19 (at Step S2). Specifically, in the transmission 19, engagement states of the clutch mechanisms involved in the upshifting operation are switched if the judgment of shifting operation is satisfied. However, even if such switching operation has already commenced but the input revolution of the transmission 19 has not yet been lowered, the judgment at Step S2 will be negative. Then, it is judged whether or not the revolution frequency of the motor generator 3 is raised higher than a predetermined revolution frequency (at Step S3). In the judgment carried out at Step S3, the following formula (1) is used:

$$nmg2 = No \times atgear + NMG2FUKI \qquad (1).$$

In the above formula (1), "nmg2" represents the "revolution frequency of the motor generator 3", "No" represents the "output revolution of the transmission 19", "atgear" represents a "gear ratio (i.e., speed change ratio) of the gear stage before the upshifting", and "NMG2FUKI" represents an additional value". That is, at Step S3, it is judged how much the revolution frequency of the motor generator 3 is higher than the input revolution of the transmission 19 obtained from the speed change ratio before the upshifting and the output revolution of the transmission 19.

As explained above, in the transmission 19, the upshifting operation is carried out by engaging and releasing the clutch mechanisms, and the torque capacity between the input and output elements of the transmission 19 is reduced in the process of the switching operation of the clutch mechanisms. In case the torque capacity is reduced to a certain extent, a load resulting from running of the vehicle 1 is reduced. As a result, the revolution frequency of the motor generator 3 is raised. That is, at this step S3, it is judged whether or not the torque capacity between the input and output elements of the transmission 19 is reduced by a predetermined value. In case the answer of step S3 is YES, a raise in the engine revolution is suppressed by raising regenerative torque of the motor generator 3 rotating in the forward direction, in other words, by widening a difference from zero Newton-meter (at Step S4). Then, the routine in ended. For the sake of convenience, Step 4 is expressed as "implement raise of MG2 torque" in FIG. 1. To the contrary, in case the answer of step S3 is NO, the control routine is returned without changing the torque of the motor generator 3 rotating in the forward direction and functioning as a generator.

On the other hand, in case the answer of step S2 is YES, it is judged whether or not the vehicle 1 is in an "EV running" (at Step S5). Here, the definition of "EV running" is to generate driving force by transmitting the torque of the motor generator 3 to the wheel 5. The torque of the motor generator 16 is controlled to zero Newton-meter, and the engine torque is not transmitted to the wheel 5. In case the answer of step S5 is NO, the control of raising the regenerative torque of the motor generator 3 is terminated, and a control of lowering the reaction torque established by the motor generator 16 is carried out to suppress the rise in the engine revolution (at Step S6). Then the control routine is ended. To the contrary, in case the answer of step S5 is YES, the routine advances to Step S4 to carry out the control of raising the torque of the motor generator 3. However, the motor generators 3 and 16 are controlled differently in each case, such as, in the case in which the routine advances from Step S3 to Step S4, and in the case in which the routine advances from Step S5 to Step S4. Details of this point will be explained later.

Figure 6:
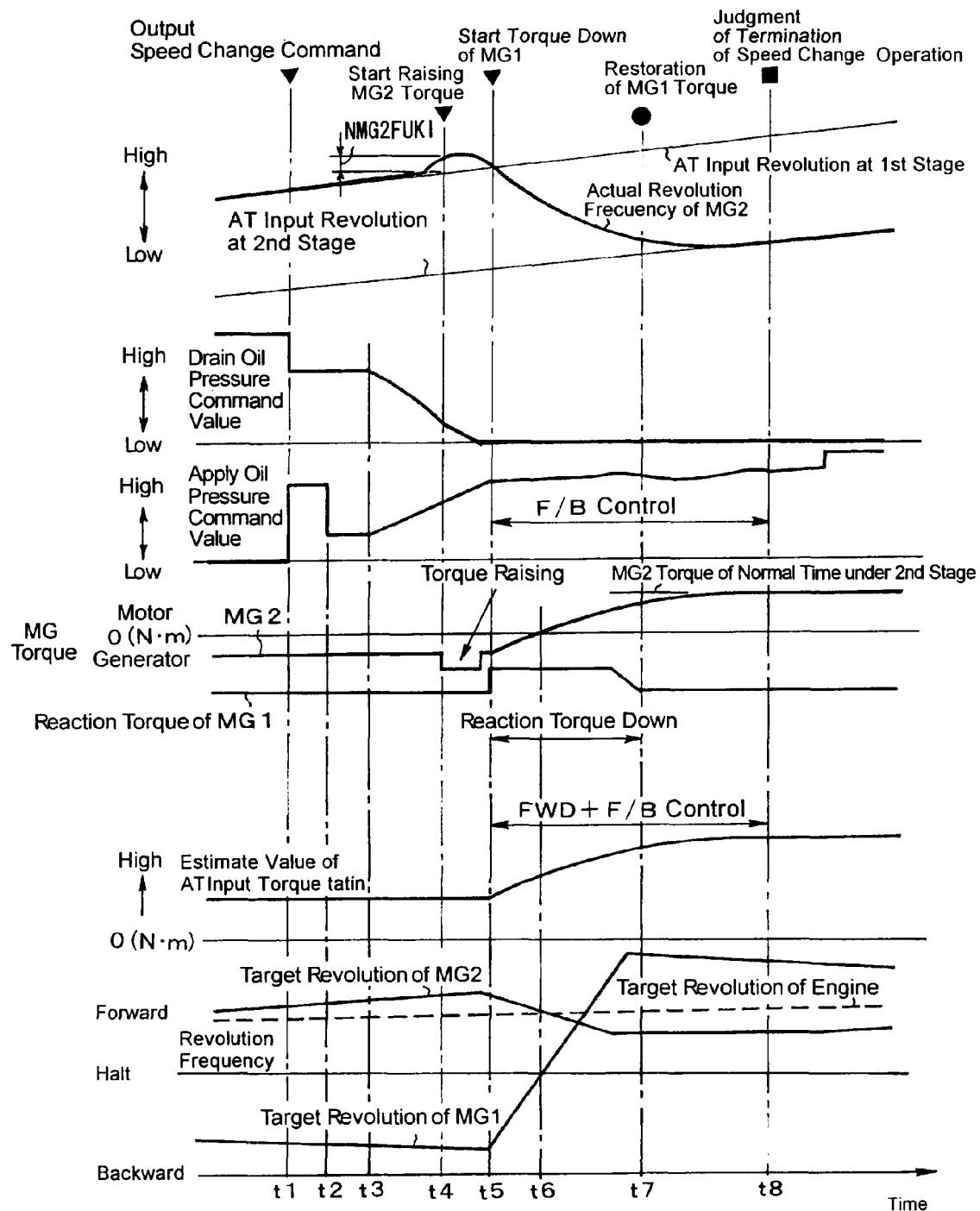
FIG. 6 is a time chart corresponding to the control method shown in FIG. 1.

Next, here will be explained one example of a time chart corresponding to the flowchart in FIG. 1 with reference to FIG. 6. For the sake of convenience, FIG. 6 shows a case of carrying out an upshifting from the first stage to the second stage. First of all, the conditions to carry out the upshifting are not satisfied at the time t1.

Before the time t1, an oil pressure for engaging the brake B2 to be engaged in the first stage is controlled to high pressure, and an oil pressure for engaging the brake B1 to be engaged in the second stage is controlled to low pressure. Also, a target revolution for rotating the motor generator 16 establishing a reaction force in the backward direction, and a target revolution for rotating the motor generator 3 in the forward direction, are set before the time t1. In FIG. 6, there are indicated input revolutions of the transmission 19 under the first and the second stages (i.e., AT input revolution). In this situation, the motor generator 3 is functioning as a generator, and the motor generator 16 is establishing a predetermined reaction torque. Here, the vehicle speed is increasing gradually, and the revolution frequency of the motor generator 3 is identical to the input revolution of the transmission 19 (i.e., AT input revolution).

When the conditions to carry out the upshifting from the first stage to the second stage at the time t1, a command to lower the oil pressure for engaging the brake B2 (i.e., a drain oil pressure command value) is outputted, and a command to raise the oil pressure for engaging the brake B1 (i.e., an apply oil pressure command value) is outputted. Then, at the time t2, a command to lower the oil pressure for engaging the brake B1 temporarily is outputted, and the oil pressure for engaging the brake B1 is kept substantially constant. On the other hand, the oil pressure for engaging the brake B2 is kept substantially constant after the time t1. At the time t3, a command to further lower the oil pressure of the brake B2, and a command to raise the oil pressure for engaging the brake B1 are outputted. When the oil pressure for engaging the brake B2 is lowered, the torque capacity transmitted between the input and the output elements of the transmission 19 is further lowered. As a result, the load on the motor generator 3 is lightened, and the revolution frequency of the motor generator 3 exceeds the input revolution of the transmission 19 (i.e., AT input revolution). When the aforementioned judgment of Step S3 is satisfied at the time t4, the process of Step S4, specifically, a control to raise the regenerative torque of the motor generator 3 (to widen a difference from zero Newton-meter) is carried out. The revolution frequency of the motor generator 3 is lowered by thus raising the regenerative torque thereof, and then the regenerative torque of the motor generator 3 is returned to the value of before the time t4.

Then, when the oil pressure for engaging the brake B2 reaches the lowest value and the oil pressure for engaging the brake B1 is raised to a predetermined value, the revolution frequency of the motor generator 3 falls to below the input revolution of the transmission 19 at the time t5. That is, the inertia phase commences. In this situation, a control to approximate the regenerative torque of the motor generator 3 rotating in the forward direction to zero Newton-meter is carried out. Also, the target revolution of the motor generator 16 rotating in the backward direction is lowered, and the reaction torque established by the motor generator 16 is thereby lowered (i.e., the process of Step S6). Then, the revolution frequency of the motor generator 3 is further lowered at the time t6. On the other hand, the rotational direction of the motor generator 16 functioning as a generator shifts from the backward direction to the forward direction, and the revolution frequency of the motor generator 16 is further raised. Meanwhile, the motor generator 3 rotating in the forward direction and functioning as a generator starts functioning as a motor after the time t6. Here, even if the motor generator 3 rotating in the forward direction and functioning as a generator starts functioning as a motor, and the revolution frequency thereof varies, a magnitude of the reaction torque will not be changed. Then, the reaction torque of the motor generator 16 is returned to the value of before the time t5. After the time t7, the target input revolution of the motor generator 16 is lowered gradually. On the other hand, the target input revolution of the motor generator 3 is kept substantially constant. Then, at the time t8, when the revolution frequency of the motor generator 3 is synchronized with the input revolution of the transmission 19 under the second stage, a termination of the shifting operation is judged (i.e., a judgment of termination of the shifting operation).

Figure 7:
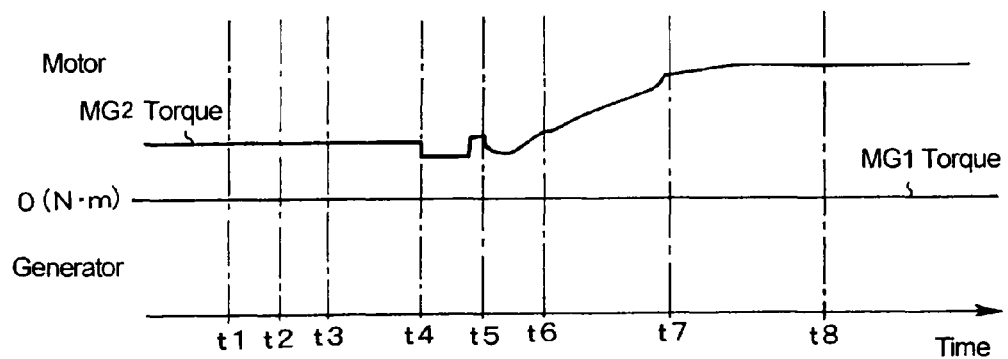
FIG. 7 is an another time chart corresponding to the control method shown in FIG. 1.

Next, here will be explained one example of a time chart of the case in which the answer of Step S5 is YES so that the routine advances from Step S5 to Step S4 with reference to FIG. 7. In this case, the motor generator 3 is rotating in the forward direction and functioning as a motor. At the time t4, a control of lowering the torque of the motor generator 3 functioning as a motor is carried out. The torque of the motor generator 3 is raised temporarily and lowered again at the time t5, and then, the torque of the motor generator 3 is further raised. In this case, the torque of the motor generator 16 is kept at zero Newton-meter, and the engine torque is not transmitted to the transmission 19. Here, the times indicated in FIG. 7 correspond to those indicated in FIG. 6.

Figure 1:
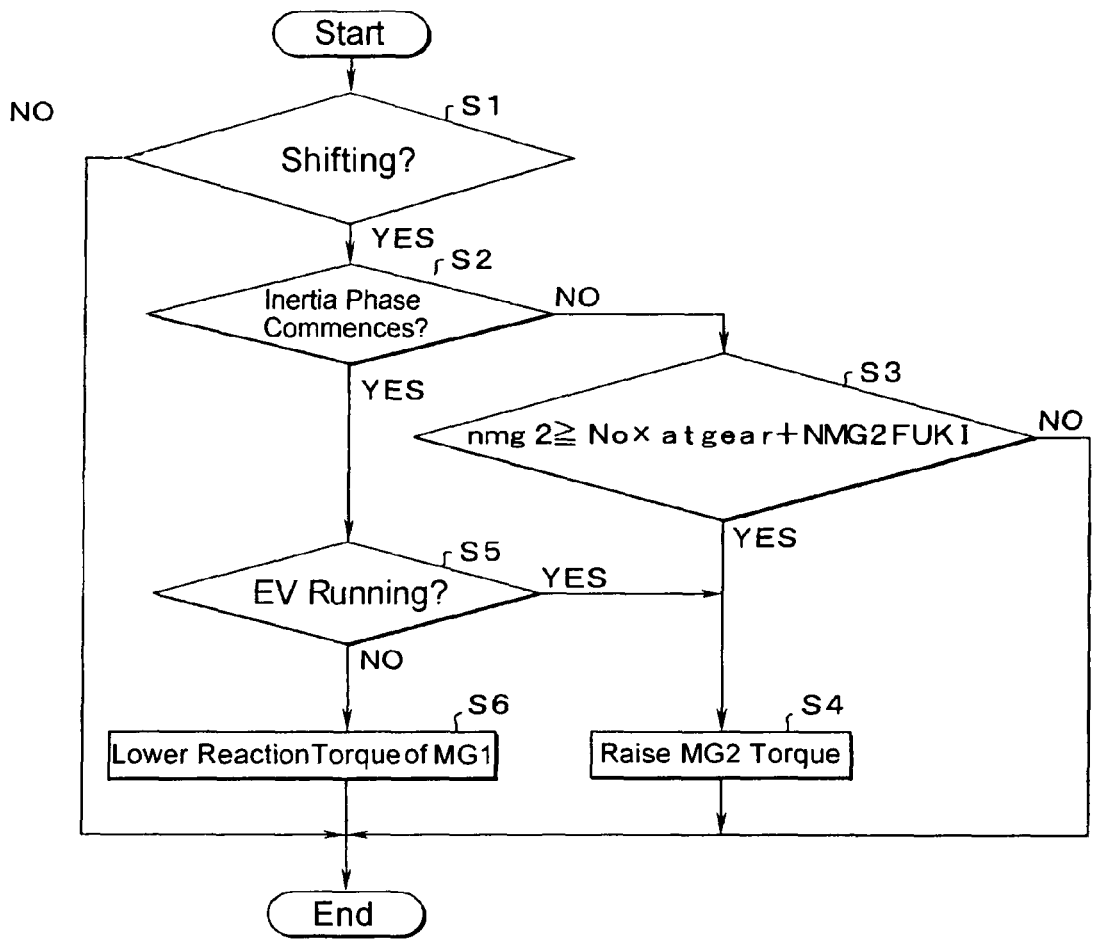
FIG. 1 is a flowchart explaining a control method carried out by the control system of the invention for a drive unit of a vehicle.

Thus, according to the control method shown in FIG. 1, shocks resulting from engagement and releasing operations of the clutch mechanisms can be suppressed by carrying out the control of lowering the torque transmitted to the transmission 19, in case of carrying out an upshifting of the transmission 19 while the accelerator is on. Moreover, the control of the speed change ratio of the power distribution mechanism 8, and the suppression of shocks resulting from the shifting operation of the transmission 19 can be put into practice at the same time. Further, according to the control example shown in FIG. 1, the engine revolution can be kept at substantially constant from before the commencement to the termination of the upshifting operation, as indicated in the time chart of FIG. 6. This is because timings of starting the control of the speed change ratio of the power distribution mechanism 8 and starting the control of the gear stage of the transmission 19 can be synchronized. More specifically, the progression of the shifting operation of the transmission 19 and the control of lowering the reaction torque of the motor generator 16 can be carried out cooperatively. Here, the revolution frequency of the motor generator 16 and the engine torque are controlled to equalize the power of the engine 2 during this shifting operation. Although the time chart of FIG. 6 indicates the case of upshifting from the first stage to the second stage, the same advantages can be achieved also in case of upshifting from the second stage to the third stage. If the transmission is adopted to engage and release the clutch mechanisms in case of upshifting from the third stage to the fourth stage, the control of FIG. 1 can also be carried out in case of upshifting from the third stage to the fourth stage. In addition, if the transmission is capable of setting the fifth or higher stage, the control of FIG. 1 can also be carried out in case of upshifting from the fourth stage to the fifth stage.

Here will be explained a corresponding relation between the example illustrated in FIG. 2 and the invention. The engine 2 corresponds to the engine of the invention; the motor generator 16 corresponds to the reaction force establishing device and the first electric motor of the invention; the motor generator 3 corresponds to the prime mover and the second electric motor of the invention; the wheel 5 corresponds to the wheel of the invention; the power distribution mechanism 8 corresponds to the continuously variable transmission and the electrical continuously variable transmission of the invention; the transmission 19 corresponds to the transmission of the invention; the carrier 12 corresponds to the input element of the invention; the ring gear 10 corresponds to the output element of the invention; the sun gear 9 corresponds to the reaction element of the invention; and the clutches C1 and C2, and the brakes B1 and B2 correspond to the clutch mechanisms and the engagement devices of the invention. Also, the clutch C1 corresponds to the first clutch of the invention; the clutch C2 corresponds to the second clutch of the invention; the brake B1 corresponds to the first brake of the invention; and the brake B2 corresponds to the second brake of the invention. Additionally, the first planetary gear transmission mechanism 20 and the second planetary gear transmission mechanism 21 correspond to the two sets of planetary gear mechanisms of the invention; and the electric storage devices 31 and 33 correspond to the electric power feeding device of the invention. Here, the ring gear 23 also functions as the input rotary member of the invention, and the sun gears 22 and 26 also function as the output rotary member of the invention. Corresponding relations between FIGS. 1 and 2, and the invention will also be explained hereinafter. The electronic control unit 36 in FIG. 2 for carrying out the controls of Steps S1 and S2 in FIG. 1 corresponds to the inertia phase judging means of the invention; the electronic control unit 36 in FIG. 2 for carrying out the controls of Steps S3 and S4 in FIG. 1 corresponds to the first input torque control means of the invention; the electronic control unit 36 for carrying out the controls of Steps S1, S2, S4 and S5 in FIG. 1 corresponds to the second input torque control means of the invention; and the electronic control unit 36 of FIG. 2 for carrying out the controls of Steps S3, S4 and S6 in FIG. 1 corresponds to the engine revolution control means of the invention.

Figure 8:
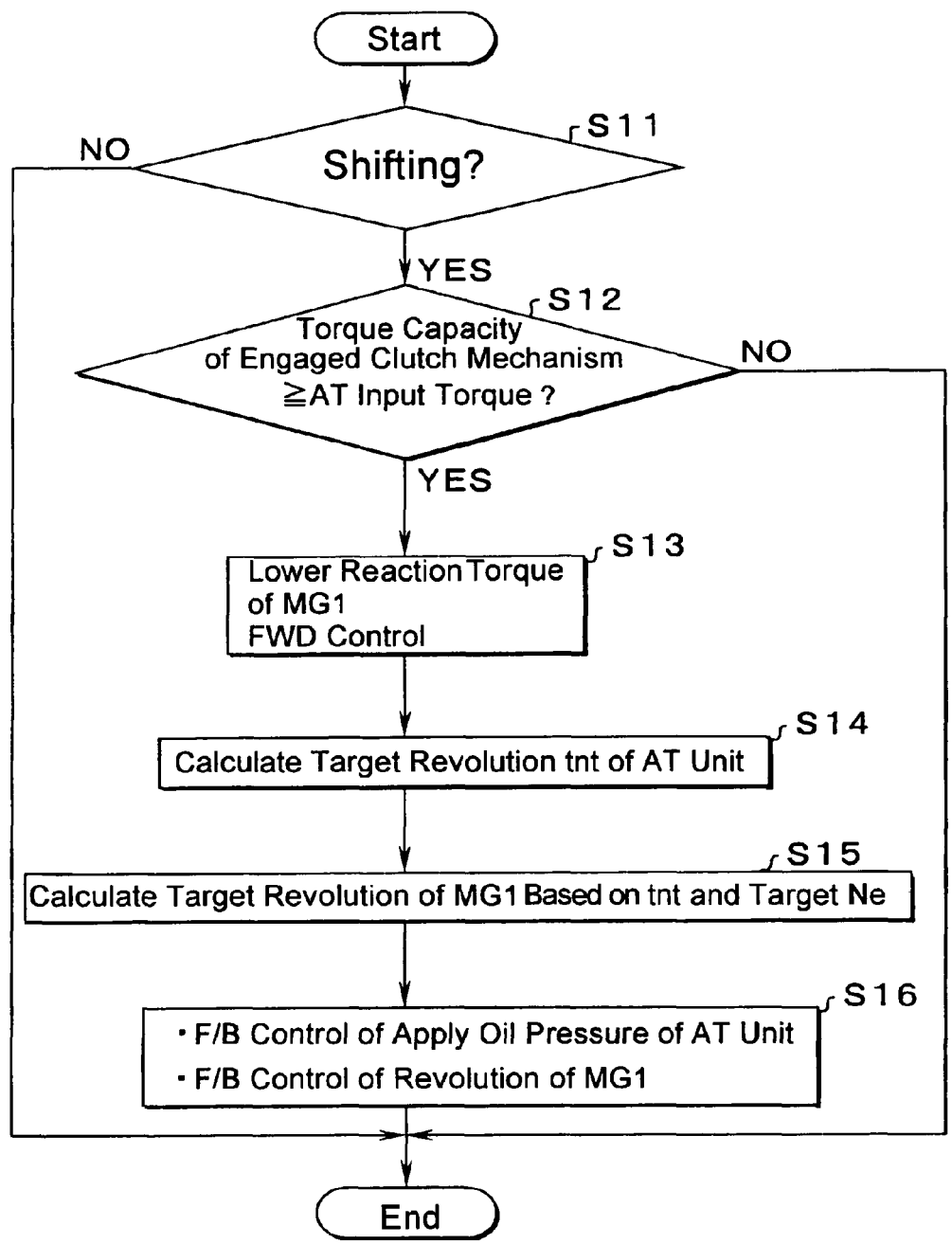
FIG. 8 is a flowchart showing a control method in which a part of steps in the control method shown in FIG. 1 is embodied.

Next, here will be explained a specific control method for controlling the gear stage of the transmission 19 with reference to FIG. 8. FIG. 8 explains a part of the control contents of FIGS. 1 and 6 more specifically. First of all, it is judged whether or not a shifting operation of the gear stage of the transmission 19 is being carried out (at Step S11). The judgment carried out at Step S1 is identical to that carried out at Step S1 in FIG. 1, and the routine is returned if the answer of Step S11 is NO. To the contrary, in case the answer of Step S11 is YES, it is judged whether or not the torque capacity of the clutch mechanism to be engaged under the gear stage after the shifting operation exceeds a value possible to transmit the torque transmitted to the input shaft of the transmission (AT) 19 (at Step S12). For example, the torque inputted to the transmission 19 is obtained by the following formula (2):

$$\text{input torque } tatin = -tg/\rho + tm \qquad (2).$$

Here, "−tg" represents the "regenerative torque of the motor generator 16", "tm" represents the "torque of the motor generator 3 functioning as a motor", and "ρ" represents the "speed change ratio of the power distribution mechanism 8". In case the answer of Step S12 is NO, the control routine is returned.

To the contrary, in case the answer of Step S12 is YES, a control for lowering the reaction torque established by the motor generator 16 is carried out (at Step S13). This Step S13 corresponds to Step S6 in FIG. 1, and the reaction torque of the motor generator 13 is controlled on the basis of a value which is set in advance as a feed-forward control (FWD) value. The feed-forward control value can be obtained from a map indicating a relation between a changing amount of the revolution frequency of the motor generator 13 before and after the shifting operation and a target shifting time from the beginning to the end of the shifting operation. Subsequent to Step S13, a target input revolution tnt of the transmission 19 in the process of the shifting operation, and a target shifting time for the time required from the beginning to the end of the shifting operation (at Step S14). At Step S14, the target input revolution tnt and the target shifting time are mapped on the basis of the following conditions, such as durability of the gears and the rotary members constituting the transmission 19, shift shocks, vehicle speed, an input torque and so on. A changing rate of the target input revolution is also obtained from those values.

Then, subsequent to Step S14, in order to achieve the target engine revolution obtained from the target input revolution tnt obtained at Step S13 and the optimum fuel economy curve, a target revolution of the motor generator 16 is obtained (at Step S15). Here, the target engine revolution is kept substantially constant during the shifting operation. Specifically, at Step S15, the target input revolution of the motor generator 16 in the process of the shifting operation is obtained on the basis of a balance among the three elements constituting the power distribution mechanism 8. In this case, the corresponding relation among the engine revolution, the revolution frequencies of the motor generators 16 and 3 is expressed by the following formula (3):

$$Ne = \rho/(1+\rho) \times \text{revolution frequency of the motor generator } 16 + 1/\rho \times \text{revolution frequency of the motor generator } 3 \quad (3).$$

Here, "$\rho$" represents the speed change ratio between the input and output elements of the power distribution mechanism 8.

Subsequent to Step S15, a feedback control to approximate an actual engagement pressure of the clutch mechanisms to be engaged under the gear stage after the shifting operation to the target torque capacity, and a feedback control to approximate the actual revolution frequency of the motor generator 16 to the target revolution obtained at Step S15, are carried out (at Step S16). Then, the control routine is ended. At Step S16, the target torque capacities of the clutch mechanisms are obtained on the basis of the target input revolution obtained at Step S14 and the changing rate thereof. Specifically, at Step S16, a correction amount for reducing a deviation between the actual engaging pressures of the clutch mechanisms and the target torque capacity, and a correction amount for reducing a deviation between the actual revolution frequency of the motor generator 16 and the target revolution are calculated.

Next, here will be explained a relation between the processes carried out at individual steps in the flowchart of FIG. 8 and the time chart of FIG. 6. Firstly, the input torque of the transmission 19 to be used for the judgment at Step S12 is substantially constant before the time t5. The input torque of the transmission 19 is raised gradually from the time t5, and then kept substantially constant after the time t8. The feed-forward control of the reaction torque of the motor generator 16 at Step S13, and the feedback control of the revolution frequency of the motor generator 16 at Steep S15 are carried out between the time t5 and the time t8 in FIG. 6. Also, the target input revolution of the motor generator 3 between the time t5 to the time t8 is determined from the target input revolution of the transmission 19 determined at Step S14. Additionally, the feedback control for the engagement pressure of the clutch mechanism is reflected in the apply pressure command value from the time t5 to the time t8.

As has been explained, if the control method of FIG. 8 is carried out in parallel with the control method of FIG. 1, the reaction torque established by the motor generator 16 is lowered in case the torque capacities of the clutch mechanisms to be engaged under the gear stage after the shifting operation exceed the torque inputted to the transmission 19. This enables to synchronize the start timings of the speed change operation of the power distribution mechanism 8 and the shifting operation of the transmission 19. Therefore, the revolution frequency of the engine can be kept constant. In addition to above, the target input revolution of the transmission 19 in the process of the shifting operation is obtained after the commencement of the inertia phase in the transmission 19, and the target torque capacities of the clutch mechanisms to be engaged under the gear stage after the shifting operation are obtained according to the change in the target input revolution. Then, engagement pressures of the clutch mechanisms in the process of the shifting operation are approximated to the target torque capacity. Subsequently, the target input revolution of the motor generator 16 in the process of the shifting operation is obtained on the basis of the obtained target input revolution of the transmission 19 and the target engine revolution. Therefore, the actual input revolution of the motor generator 16 can be approximated to the target input revolution thereof. Here, the torque capacity of the clutch mechanism is governed by the engagement pressure of the clutch mechanism. For the reasons above, the speed change control of the power distribution mechanism 8 and the shifting control of the transmission 19 can be synchronized much easier.

Here will be explained a corresponding relation between the examples sown in FIGS. 2 and 8 and the invention. The electronic control unit 36 carrying out the control of Step S11 in FIG. 8 corresponds to the inertia phase judging means of the invention; the electronic control unit 36 carrying out the controls of Steps S12 and S13 in FIG. 8 corresponds to the first input torque control means of the invention; the electronic control unit 36 carrying out the control of Step S14 in FIG. 8 corresponds to the target input revolution calculating means of the invention; the electronic control unit 36 carrying out the control of Step S16 in FIG. 8 corresponds to the first torque capacity control means of the invention; the electronic control unit 36 carrying out the controls of Steps S15 and S16 in FIG. 8 corresponds to the electric motor control means of the invention; and the electronic control unit 36 carrying out the controls of Steps S13, S14, S15 and S16 in FIG. 8 corresponds to the engine revolution control means of the invention.

Figure 9:
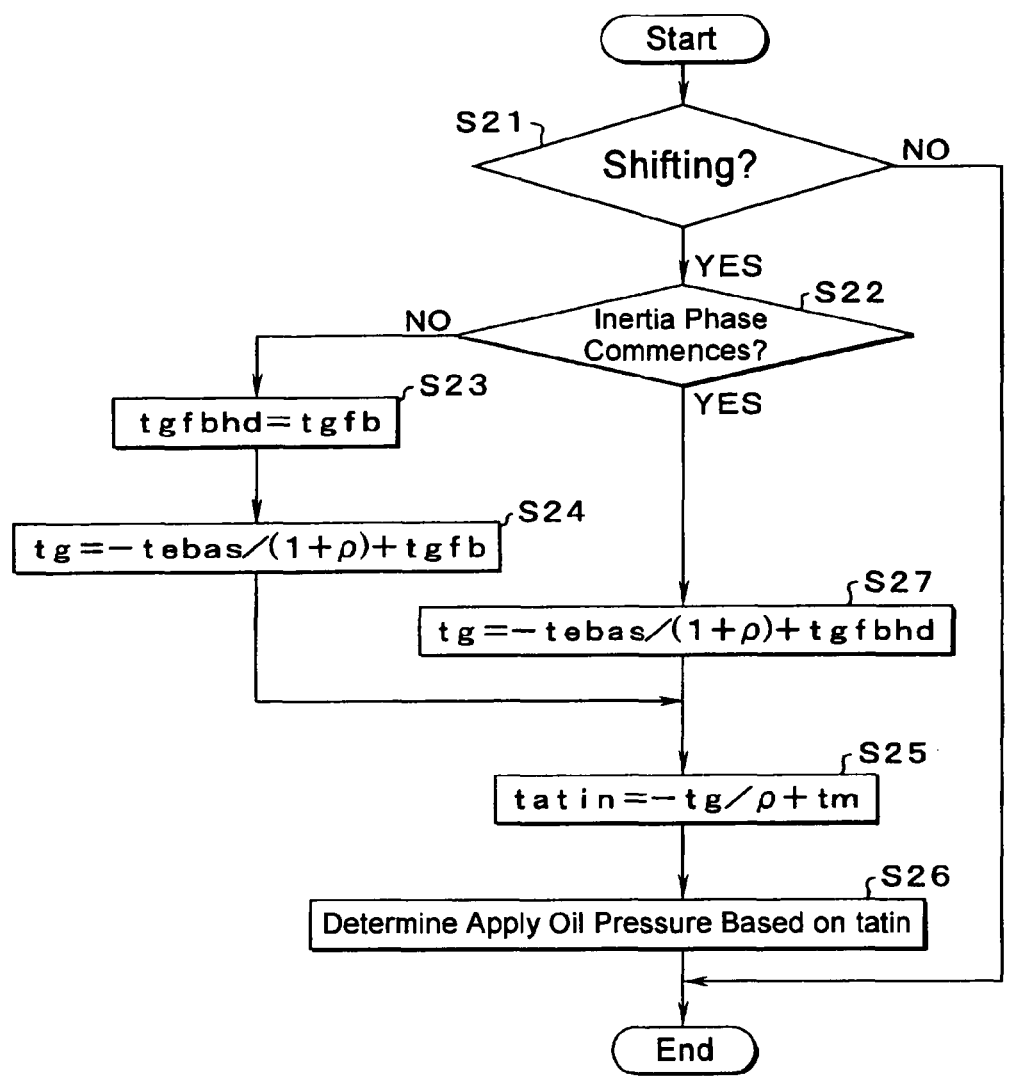
FIG. 9 is a flowchart showing a control method, in which a part of steps in the control method shown in FIG. 1 is embodied, and which can be carried out in addition to the control method shown in FIG. 8.

The flowchart in FIG. 9 explains a more specific control method of the control methods of FIGS. 1 and 8 to be carried out in the process of the shifting operation of the gear stage of the transmission 19. First of all, it is judged whether or not a shifting operation is being carried out (at Step S21). In case the answer of Step S21 is NO, the control routine is ended. To the contrary, in case the answer of Step S21 is YES, it is judged whether or not an inertia phase commences (at Step S22). That is, the judgment of Step S21 is identical to that of Step S1 in FIG. 1, and the judgment of Step S22 is identical to that of Step S2 in FIG. 1. Then, in case the answer of Step S22 is NO, a process of storing a hold value tgfbhd is carried out (at Step S23). Here, the hold value tgfbhd is the correction value tgfb, which is to be used in case of carrying out the feedback control for approximating the actual torque of the motor generator 16 establishing the reaction torque in the power distribution mechanism 8 to the target torque. Subsequent to Step S23, a torque tg of the motor generator 16 is obtained (at Step S24). At Step S24, for example, the following formula (4) is used:

$$tg = -tebas/(1+\rho) + tgfb \quad (4).$$

Here, "tebas" represents an "estimate value of the engine torque", which is obtained from, e.g., an opening degree of the throttle and a revolution frequency of the engine. Additionally, "tgfb" is the aforementioned correction value.

Then, subsequent to Step S24, an input torque tatin to be inputted to the transmission 19 is obtained at Step S25 by the following formula (5):

$$tatin = -tg/\rho + tm \quad (5).$$

Here, "tm" represents the "torque of the motor generator 3 functioning as a motor", and "–tg" represents the "regenerative torque of the motor generator 16". Then, the target torque capacities of the clutch mechanisms are obtained on the basis of the input torque tatin obtained at Step S25, and a target torque capacity (or a target oil pressure) corresponding to the obtained target torque capacity is determined (at Step S26). After this, the control routine is ended. Here, at Step S26, the feedback control is carried out on the basis of a deviation between the actual engagement pressure of the clutch mechanism and the target torque capacity.

On the other hand, in case the answer of Step S22 is YES, a torque of the motor generator 16 is obtained (at Step S27) by the following formula (6):

$$tg = -tebas/(1+\rho) + tgfbhd \quad (6),$$

and then, the routine advances to Step S25. That is, after the commencement of the inertia phase, the torque tg of the motor generator 16 is obtained using the hold value tgfbhg processed at Step S23.

Next, here will be explained one example of a time chart including the control method of FIG. 9 with reference to FIG. 10. Here, the times indicated in the time chart of FIG. 10 correspond to those indicated in FIG. 6. In the time chart of FIG. 10, the reaction torque of the motor generator 16 is kept substantially constant before the time t5, and the correction value tgfb used for the feedback control of the torque of the motor generator 16 is also kept substantially constant. As explained above, the reaction torque of the motor generator 16 is lowered from the time t5 when the inertia phase commences to the time t7. However, as has been mentioned in the explanation of Steps 23 and 27, the correction value tgfb is kept to the value of before the time t5 also in the period from the time t5 to the time t7. Also, the feedback control is carried out on the basis of the target torque capacity obtained at Step S26, from the time t5 when the inertia phase commences to the time t8 when the judgment of termination of the shifting operation is to be satisfied.

Figure 10:
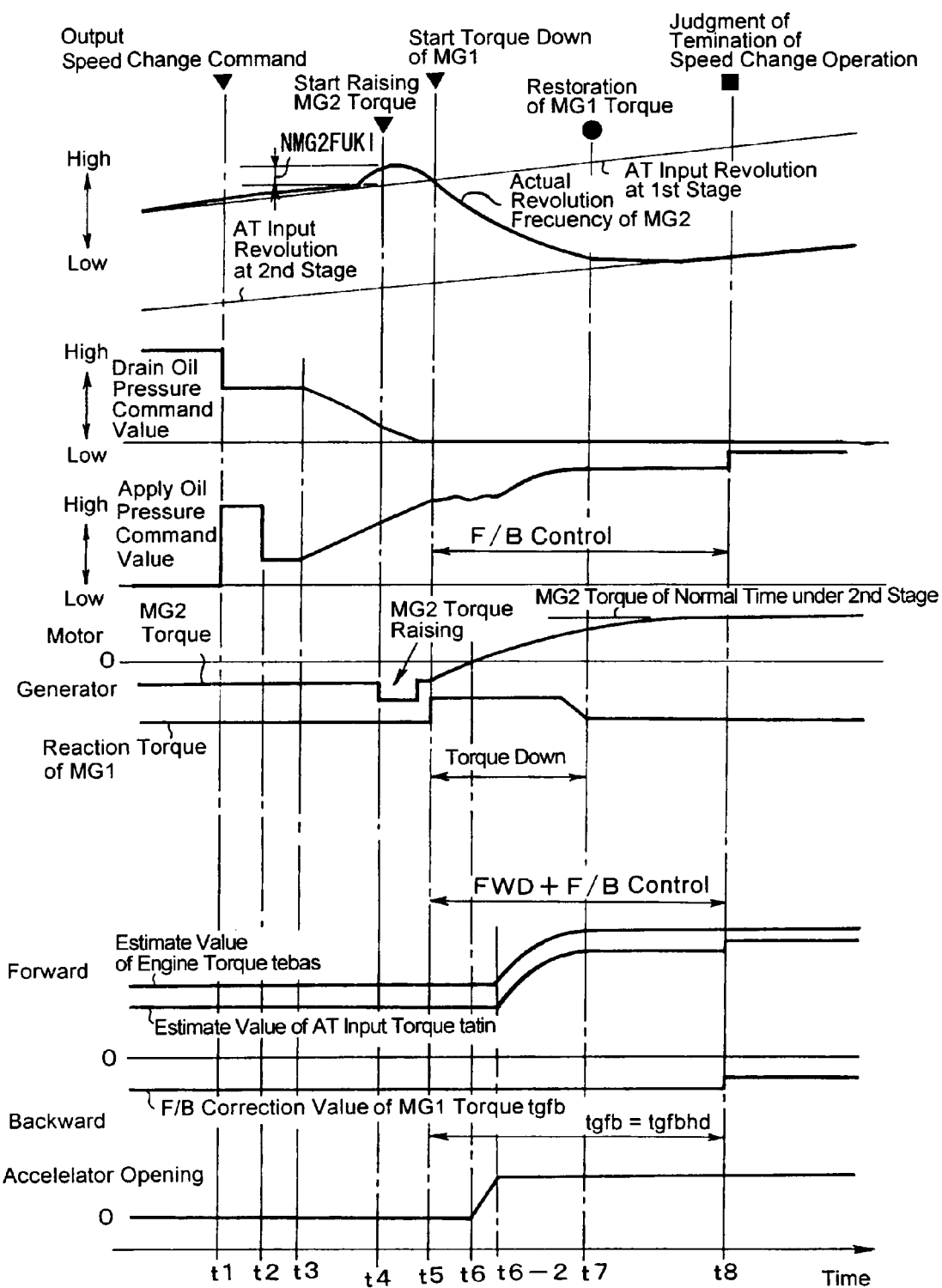
FIG. 10 shows one example of a time chart corresponding to the control method shown in FIG. 9.

Here, in the time chart of FIG. 10, the opening degree of the accelerator, the estimate value of the engine torque and the input torque of the transmission 19 are kept substantially constant before the time t6. The opening degree of the accelerator is increased from the time t6, and the engine torque and the input torque of the transmission 19 are increased from the time t6-2. Then, the opening degree of the accelerator, the estimate value of the engine torque and the input torque of the transmission 19 are kept substantially constant after the time t7. When the shifting operation is completed at the time t8, the input torque of the transmission 19 is raised and the correction value tgfb is released from the fixed state. In the sections of the time chart of FIG. 10 in common with the time chart of FIG. 6, the controls identical to those in FIG. 6 are carried out. Here, the control method of FIG. 9 is carried out in combination with that of FIG. 1. The aforementioned control methods of FIGS. 8 and 9 may be carried out separately. Otherwise, those control methods of FIGS. 8 and 9 may also be carried out together. In case of carrying out both controls, the target torque capacity of the clutch mechanism is controlled by both processes of Step 16 in FIG. 8 and Step S26 in FIG. 9.

Thus, according to the control method shown in FIG. 9, the reaction torque of the motor generator 16 is lowered in the process of the shifting operation of the transmission 19, especially in the inertia phase. However, for the purpose of controlling the torque capacities of the clutch mechanisms of the transmission 19, the input torque of the transmission 19 is obtained using the correction value tgfbhd which has been held before the commencement of the inertia phase, and the engaging pressures of the clutch mechanisms are determined in accordance with the calculation result of the input torque. Accordingly, the hydraulic control unit 35 can carry out a usual hydraulic control based on the premise that the torque of the transmission 19 is constant. Besides, although the opening degree of the accelerator is increased in the inertia phase so that the engine torque and the estimate value of the input torque of the transmission 19 are increased, the input torque of the transmission 19 may also be obtained on the basis of the correction value tgfbhd being held during the inertia phase. Here will be explained a corresponding relation between the examples in FIGS. 2 and 9, and the invention. The electronic control unit 36 carrying out the control of Steps S21 and S22 in FIG. 9 corresponds to the inertia phase judging means of the invention; the electronic control unit 36 carrying out the controls of Steps S27 and S25 in FIG. 9 corresponds to the input torque calculating means of the invention; and the electronic control unit 36 carrying out the control of Step S26 in FIG. 9 corresponds to the second torque capacity control means of the invention.

Figure 11:
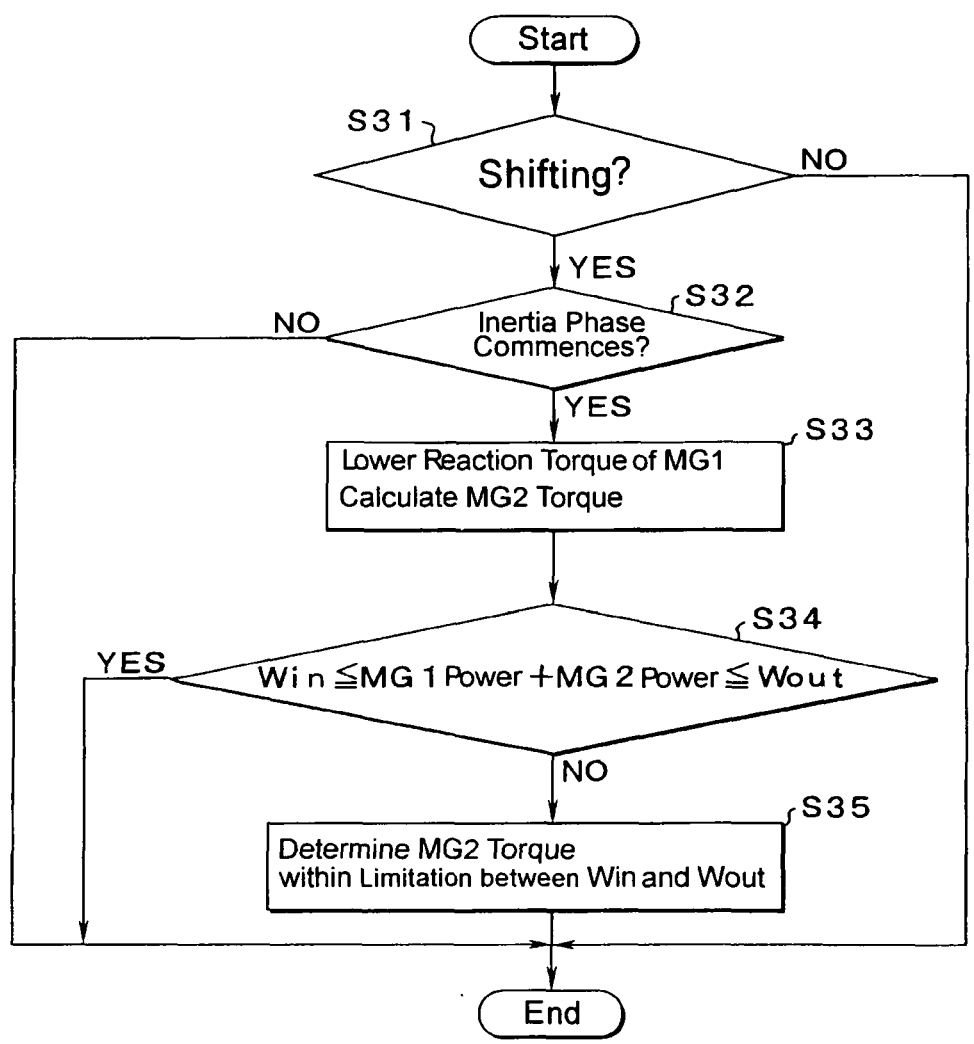
FIG. 11 is a flowchart showing a control method, in which a part of steps in the control method shown in FIG. 1 is embodied, and which can be carried out in addition to the control method shown in FIG. 8.

Next, here will be explained a control method in which a part of the control method of FIG. 1 is embodied with reference to FIG. 11. First of all, it is judged whether or not a shifting operation of the gear stage of the transmission 19 is being carried out (at Step S31). In case the answer of Step S31 is NO, the control routine is ended. To the contrary, in case the answer of Step S31 is YES, it is judged whether or not an inertia phase commences (at Step S32). That is, the judgment of Step S31 is identical to that of Step S1 in FIG. 1, and the judgment of Step S32 is identical to that of Step S2 in FIG. 1. In case the answer of Step S32 is NO, the control routine is ended. To the contrary, in case the answer of Step S32 is YES, the reaction torque established by the motor generator 16 is lowered, and the torque of the motor generator 3 is obtained (at Step S33) to equalize the power of the engine 2 while keeping the engine revolution substantially constant.

Subsequently to Step S33, it is judged whether or not a balance between a feeding amounts of the electric power to the motor generators 3 and 16 and a charging amounts of the electric power into the electric storage devices 31 and 33, is within a predetermined range using the following formula (7) (at Step S34):

$$\text{Win} \leq MG1\ \text{power} + MG2\ \text{power} \leq \text{Wout} \quad (7).$$

Here, "Win" represents a "limit value of the charging amount into the electric storage devices 31 and 33", and "Wout" represents a limit value of the discharging amounts from the electric storage devices 31 and 33". In case the answer of Step S34 is YES, the control routine is ended. To the contrary, is case the answer of Step S34 is NO, the torque of the motor generator 3 is determined to satisfy the above formula (7) (at Step S35), and then the control routine is ended.

Figure 12:
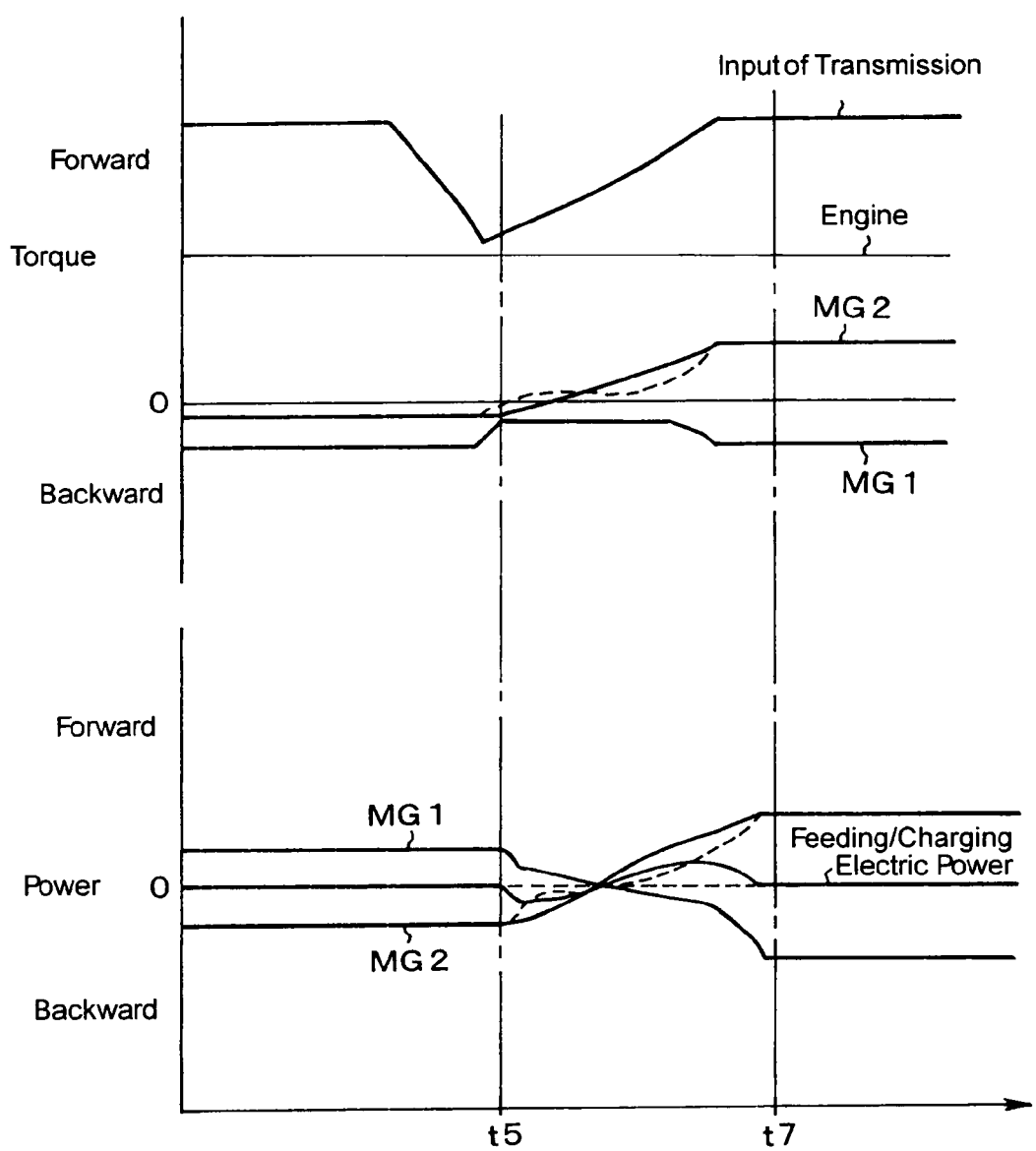
FIG. 12 shows one example of a time chart corresponding to the control method shown in FIG. 11.

Here will be explained one example of a time chart corresponding to the control method of FIG. 11 with reference to FIG. 12. In the beginning, the torque inputted to the transmission 19 is lowered, the reaction torque of the motor generator 16 is temporarily lowered, and the torque of the motor generator 3 is controlled to suppress a rise in the revolution frequency of the engine 2. On the other hand, powers of the motor generators 3 and 16, and the engine 2 are kept substantially constant, and the electric storage devices 31 and 33 neither discharging the electric power therefrom nor being charged with the electric power in the beginning. Then the power of the motor generator 16 (MG1) is changed from the positive side to the negative side, and the power of the motor generator 3 (MG2) is changed from the negative side to the positive side. As a result, the engine power is kept constant. In case the charging of the electric storage devices 31 and 33, and discharging from the electric storage devices 31 and 33 as represented by the solid lines are expected in the process of changing the phases of the motor generators 3 and 16 between the negative and positive phases, the charging and discharging amounts of the electric storage devices 31 and 33 can be maintained within a predetermined range (as represented by broken lines) by controlling the power of the motor generator 3 as represented by the broken line. Here will be explained a corresponding relation between the examples in FIGS. 2 and 11, and the invention. The electronic control unit 36 carrying out the control of Steps S31 and S32 in FIG. 11 corresponds to the inertia phase judging means of the invention; and the electronic control unit 36 carrying out the controls of Steps S34 and S35 in FIG. 11 corresponds to the electric power balance control means of the invention.

In the power train illustrated in FIG. 2, although the single pinion type planetary gear mechanism is used as the power distribution mechanism 8, a double pinion type planetary gear mechanism may also be used as the power distribution mechanism. In this case, rotary elements are connected to arrange the engine between two motor generators in a nomographic diagram. It is also possible to use a power distribution mechanism comprising four rotary elements, in which any of those rotary elements is switched to function as an input element, reaction element and an output element selectively. On the other hand, the transmission arranged on the route from the power distribution mechanism to the wheel may also be a geared transmission capable of setting five or more gear stages under D range. Additionally, it is also possible to use a transmission in which the gear stage is controlled by a synchronizer mechanism.

According to the present invention, the definition of the "electrical continuously variable transmission" is a continuously variable transmission, in which a speed change ratio between an input element and an output element can be controlled by controlling an output of an electric motor (i.e., a motor generator) connected with the reaction element. Here, the torque capacity of the electrical continuously variable transmission will not drop even in the process of controlling the speed change ratio thereof. Also, according to the invention, the definition of the "transmission" is a transmission, which is adapted to control engagement and releasing of clutch mechanisms (i.e., a clutch and a brake), in other words, which is adapted to switch a power transmission route, in case of controlling or shifting a gear stage thereof. Additionally, unlike the electrical continuously variable transmission, the torque capacity of the transmission drops in the process of shifting the gear stage thereof, i.e., in the process of switching or releasing the clutch mechanisms.

In addition to above, the present invention may also be applied to a vehicle having an electric motor or a hydraulic motor, instead of the engine 2 as the second prime mover. Alternatively, the electric motor or the hydraulic motor may also be used as a reaction force establishing device instead of the motor generator 16. Moreover, a flywheel system and a hydraulic motor may be used as a prime mover instead of the motor generator 3. Further, a fuel cell system may also be used as an electric power feeding device in addition to the electric storage devices 31 and 33. Furthermore, an electromagnetic type clutch mechanism, a powder type clutch mechanism, a synchromesh type clutch mechanism and so on may also be used instead of the hydraulic type clutch mechanism. Here, according to the invention, the clutch mechanism includes a brake which controls a rotation and cessation of the rotary elements. In the above explained examples, although the case of carrying out an upshifting operation is explained, those examples may also be applied to a case of carrying out a downshifting of the transmission. The control examples shown in the accompanying figures may also be applied to any of a front drive vehicle (or two wheel drive vehicles), in which an engine and two motor generators are connected to front wheels, and a front drive vehicle in which an engine and two motor generators are connected to rear wheels. Further, the control examples shown in the accompanying figures may also be applied to a four wheel drive vehicle, in which an engine and two motor generators are connected to both front and rear wheels.

INDUSTRIAL APPLICABILITY

The present invention can be utilized in a field of manufacturing and repairing automobiles such as cars, and in a field of manufacturing and processing parts for automobiles.

The invention claimed is:

1. A control system for a drive unit of a vehicle, which has a reaction force establishing device controlling a speed change ratio of a continuously variable transmission, and a clutch mechanism which is arranged on a power transmission route from the continuously variable transmission to a wheel and in which a torque capacity thereof is controllable, comprising:
    a first input torque control means for lowering a torque to be inputted to the clutch mechanism through the continuously variable transmission, by controlling a torque of the reaction force establishing device while the torque capacity of the clutch mechanism is being controlled.

2. The control system for a drive unit of a vehicle as claimed in claim 1:
    wherein a prime mover is arranged on an input side of the clutch mechanism;
    comprising an inertia phase judging means for determining an inertia phase established as a result of controlling the torque capacity of the clutch mechanism; and
    wherein the first input torque control means includes a means for lowering the torque inputted to the input side of the clutch mechanism by controlling a torque of the prime mover before a commencement of the inertia phase, and a means for lowering the torque inputted to the clutch mechanism by lowering a reaction torque established by the reaction force establishing means once the inertia phase commences.

3. The control system for a drive unit of a vehicle as claimed in claim 2, wherein:
    an engine is connected to the input side of the continuously variable transmission; the reaction force establishing device functions as a first electric motor; the prime mover functions as a second electric motor; and the continuously variable transmission functions as an electrical continuously variable transmission; a transmission, in which a gear stage thereof is controlled by controlling the torque capacity of the clutch mechanism, is arranged on an output side of the electrical continuously variable transmission; the electrical continuously variable transmission comprises an input element, a reaction element and an output element capable of rotating differentially among each other; the input element is connected with the engine; the reaction element is connected with the first electric motor; the output element is connected with the second electric motor and the input side of the transmission; and speed change ratio of the electrical continuously variable transmission can be controlled steplessly by controlling an output of the first electric motor establishing an reaction force against the engine; and the inertia phase judging means includes a means for determining an inertia phase in the process of carrying out a shifting operation of the transmission while the engine torque is being transmitted to the transmission through the electrical continuously variable transmission.

4. The control system for a drive unit of a vehicle as claimed in claim 1, wherein:

the first input torque control means includes a means starting a control for lowering the reaction torque established by the reaction force establishing device, in case the torque capacity of the clutch mechanism exceeds a torque inputted to the clutch mechanism.

5. The control system for a drive unit of a vehicle as claimed in claim 3, further comprising:

a target input revolution calculating means for calculating a target input revolution of the transmission after a commencement of the inertia phase in the process of the shifting operation of the transmission;

a first torque capacity control means obtaining a target torque capacity of the clutch mechanism to be engaged under the gear stage after the shifting operation of the transmission according to a change in the target input revolution, and then approximating an actual torque capacity of the clutch mechanism in the process of the shifting operation of the transmission to the target torque capacity; and an electric motor control means obtaining a target input revolution of the first electric motor in the process of the shifting operation of the transmission based on the target input revolution of the transmission and the target engine revolution, and approximating an actual input revolution of the first electric motor to the target input revolution of the first electric motor.

6. The control system for a drive unit of a vehicle as claimed in claim 5, comprising:

an input torque calculating means for calculating a torque inputted to the transmission on the basis of a speed change ratio of the electrical continuously variable transmission and a correction value used for a feedback control of the torque of the first electric motor, after the commencement of the inertia phase in the process of a shifting operation of the transmission; and a second torque capacity control means for controlling the torque capacity of the clutch mechanism on the basis of the input torque of the transmission obtained from the correction value, in case of controlling the input revolution of the transmission after the commencement of the inertia phase in the process of the shifting operation of the transmission.

7. The control system for a drive unit of a vehicle as claimed in claim 3, further comprising:

an electric power feeding device for exchanging electric power with the first and the second electric motors; and an electric power balance control means for controlling an output of the second electric motor on the basis of a balance of electric power in the electric power feeding device, in case of equalizing the engine power by reducing the reaction force established by the first electric motor after the commencement of the inertia phase in the transmission, and by controlling the second electric motor.

8. The control system for a drive unit of a vehicle as claimed in claim 3, further comprising:

a second input torque control means for lowering a torque to be inputted to the transmission by lowering the torque of the second electric motor during the shifting operation of the transmission, in case the torque of the second electric motor is transmitted to the wheel but the torque of the engine is not transmitted to the wheel.

9. The control system for a drive unit of a vehicle as claimed in claim 5, further comprising:

an engine revolution control means for reducing a change in the engine revolution in the process of a shifting operation of the transmission.

10. The control system for a drive unit of a vehicle as claimed in claim 1, wherein:

a transmission is arranged on a route to which the power is outputted from the continuously variable transmission;

the continuously variable transmission is constructed of an electrical continuously variable transmission in which a speed change ratio thereof is controlled electrically and varied continuously; and the transmission is constructed of a geared transmission in which a gear stage thereof is changed stepwise.

11. The control system for a drive unit of a vehicle as claimed in claim 10, wherein:

the electrical continuously variable transmission and the geared transmission are connected in tandem so as to input power outputted from any one of those transmissions to the other one.

12. The control system for a drive unit of a vehicle as claimed in claim 10, wherein:

a speed change ratio of the drive unit is set by both of the electrical continuously variable transmission and geared transmission.

13. The control system for a drive unit of a vehicle as claimed in claim 3, wherein:

the electrical continuously variable transmission includes a planetary gear mechanism comprising a carrier functioning as the input element, a sun gear functioning as the reaction element, and a ring gear functioning the output element.

14. The control system for a drive unit of a vehicle as claimed in claim 3, wherein:

the transmission is constructed of two sets of planetary gear mechanisms and a plurality of engagement devices, and the clutch mechanism includes the plurality of engagement devices.

15. The control system for a drive unit of a vehicle as claimed in claim 14, wherein:

the two sets of planetary gear mechanisms include a single pinion type planetary gear mechanism;

the sun gears of the first and the second planetary gear mechanisms are connected with each other, and the carrier of the first planetary gear mechanism and the ring gear of the second planetary gear mechanism are connected with each other; and the engagement device comprises a first clutch connecting the ring gear of the first planetary gear mechanism and the output element of a power distribution mechanism selectively;

a second clutch connecting the sun gear of the first planetary gear mechanism and the sun gear of the second planetary gear mechanism with the output element of the power distribution mechanism selectively;

a first brake fixing the sun gears of the first and the second planetary gear mechanisms selectively; and a second brake fixing the carrier of the second planetary gear mechanisms selectively.

16. The control system for a drive unit of a vehicle as claimed in claim 1, wherein:

the reaction force establishing device functions as a first electric motor; the continuously variable transmission functions as an electrical continuously variable transmission; and a transmission, in which a gear stage thereof is controlled by controlling the torque capacity of the clutch mechanism, is arranged on an output side of the electrical continuously variable transmission; and comprising:

an input torque calculating means for calculating a torque inputted to the transmission on the basis of a speed change ratio of the electrical continuously variable transmission and a correction value used for a feedback control of the torque of the first electric motor, after the commencement of the inertia phase in the process of a shifting operation of the transmission; and a torque capacity control means for controlling the torque capacity of the clutch mechanism on the basis of the input torque of the transmission obtained from the correction value, in case of controlling the input revolution of the transmission after the commencement of the inertia phase in the process of the shifting operation of the transmission.

17. The control system for a drive unit of a vehicle as claimed in claim 1, wherein:

an electric motor is arranged on the input side of the clutch mechanism; the engine is connected to the input side of the continuously variable transmission; and a transmission, in which a gear stage thereof is controlled by controlling the torque capacity of the clutch mechanism, is arranged on an output side of the electrical continuously variable transmission; and further comprising a second input torque control means for lowering a torque to be inputted to the transmission by lowering the torque of the second electric motor during the shifting operation of the transmission, in case the torque of the second electric motor is transmitted to the wheel but the torque of the engine is not transmitted to the wheel.

18. The control system for a drive unit of a vehicle as claimed in claim 5, comprising:

an input torque calculating means for calculating a torque inputted to the transmission on the basis of a speed change ratio of the electrical continuously variable transmission and a correction value used for a feedback control of the torque of the first electric motor, upon commencement of the inertia phase in the process of a shifting operation of the transmission; and a second torque capacity control means for controlling the torque capacity of the clutch mechanism on the basis of the input torque of the transmission obtained from the correction value, in case of controlling the input revolution of the transmission upon commencement of the inertia phase in the process of the shifting operation of the transmission.

19. A control method for a drive unit of a vehicle, which has a reaction force establishing device controlling a speed change ratio of a continuously variable transmission, and a clutch mechanism which is arranged on a power transmission route from the continuously variable transmission to a wheel and in which a torque capacity thereof is controllable, comprising:

a first input torque control of lowering a torque to be inputted to the clutch mechanism through the continuously variable transmission, by controlling a torque of the reaction force establishing device while the torque capacity of the clutch mechanism is being controlled.

20. The control method for a drive unit of a vehicle as claimed in claim 19:

wherein a prime mover is arranged on an input side of the clutch mechanism;

comprising an inertia phase judging of determining an inertia phase established as a result of controlling the torque capacity of the clutch mechanism; and wherein the first input torque control includes lowering the torque inputted to the input side of the clutch mechanism by controlling a torque of the prime mover before a commencement of the inertia phase, and lowering the torque inputted to the clutch mechanism by lowering a reaction torque established by the reaction force establishing means once the inertia phase commences.

21. The control method for a drive unit of a vehicle as claimed in claim 20, wherein:

an engine is connected to the input side of the continuously variable transmission; the reaction force establishing device functions as a first electric motor; the prime mover functions as a second electric motor; and the continuously variable transmission functions as an electrical continuously variable transmission; a transmission, in which a gear stage thereof is controlled by controlling the torque capacity of the clutch mechanism, is arranged on an output side of the electrical continuously variable transmission; the electrical continuously variable transmission comprises an input element, a reaction element and an output element capable of rotating differentially among each other; the input element is connected with the engine; the reaction element is connected with the first electric motor; the output element is connected with the second electric motor and the input side of the transmission; and speed change ratio of the electrical continuously variable transmission can be controlled steplessly by controlling an output of the first electric motor establishing an reaction force against the engine; and the inertia phase judging includes determining an inertia phase in the process of carrying out a shifting operation of the transmission while the engine torque is being transmitted to the transmission through the electrical continuously variable transmission.

22. The control method for a drive unit of a vehicle as claimed in claim 19, wherein:

the first input torque control includes starting a control for lowering the reaction torque established by the reaction force establishing device, in case the torque capacity of the clutch mechanism exceeds a torque inputted to the clutch mechanism.

23. The control method for a drive unit of a vehicle as claimed in claim 21, further comprising:

a target input revolution calculating of calculating a target input revolution of the transmission after a commencement of the inertia phase in the process of the shifting operation of the transmission;

a first torque capacity control of obtaining a target torque capacity of the clutch mechanism to be engaged under the gear stage after the shifting operation of the transmission according to a change in the target input revolution, and then approximating an actual torque capacity of the clutch mechanism in the process of the shifting operation of the transmission to the target torque capacity; and an electric motor control of obtaining a target input revolution of the first electric motor in the process of the shifting operation of the transmission based on the target input revolution of the transmission and the target engine revolution, and approximating an actual input revolution of the first electric motor to the target input revolution of the first electric motor 24. The control method for a drive unit of a vehicle as claimed in claim 23, comprising:

an input torque calculating of calculating a torque inputted to the transmission on the basis of a speed change ratio of the electrical continuously variable transmission and a correction value used for a feedback control of the torque of the first electric motor after the commencement of the inertia phase in the process of a shifting operation of the transmission; and a second torque capacity control of controlling the torque capacity of the clutch mechanism on the basis of the input torque of the transmission obtained from the correction value, in case of controlling the input revolution of the transmission after the commencement of the inertia phase in the process of the shifting operation of the transmission.

25. The control method for a drive unit of a vehicle as claimed in claim 21, further comprising:

an electric power feeding device for exchanging electric power with the first and the second electric motors; and an electric power balance control of controlling an output of the second electric motor on the basis of a balance of electric power in the electric power feeding device, in case of equalizing the engine power by reducing the reaction force established by the first electric motor after the commencement of the inertia phase in the transmission, and by controlling the second electric motor.

26. The control method for a drive unit of a vehicle as claimed in claim 21, further comprising:

a second input torque control of lowering a torque to be inputted to the transmission by lowering the torque of the second electric motor during the shifting operation of the transmission, in case the torque of the second electric motor is transmitted to the wheel but the torque of the engine is not transmitted to the wheel.

27. The control method for a drive unit of a vehicle as claimed in claim 23, further comprising:

an engine revolution control of reducing a change in the engine revolution in the process of a shifting operation of the transmission.

28. A control system for a drive unit of a vehicle, which has a reaction force establishing device controlling a speed change ratio of a continuously variable transmission, and a clutch mechanism which is arranged on a power transmission route from the continuously variable transmission to a wheel and in which a torque capacity thereof is controllable, comprising:

a first input torque control device for lowering a torque to be inputted to the clutch mechanism through the continuously variable transmission, by controlling a torque of the reaction force establishing device while the torque capacity of the clutch mechanism is being controlled.

* * * * *

UNITED STATES PATENT AND TRADEMARK OFFICE
CERTIFICATE OF CORRECTION

PATENT NO. : 7,798,938 B2  Page 1 of 1
APPLICATION NO. : 12/091126
DATED : September 21, 2010
INVENTOR(S) : Tooru Matsubara et al.

It is certified that error appears in the above-identified patent and that said Letters Patent is hereby corrected as shown below:

On the title page, Item (54) and column 1, the title is incorrect. Item (54) and column 1 should read:

-- (54) CONTROL SYSTEM FOR DRIVE UNIT OF VEHICLE --

Signed and Sealed this

Twenty-first Day of December, 2010

David J. Kappos
*Director of the United States Patent and Trademark Office*